US009736350B2

(12) United States Patent
Mito

(10) Patent No.: US 9,736,350 B2
(45) Date of Patent: Aug. 15, 2017

(54) CONTROL APPARATUS, IMAGE INPUT APPARATUS, AND CONTROL METHODS THEREOF

(71) Applicant: CANON KABUSHIKI KAISHA, Tokyo (JP)

(72) Inventor: Koji Mito, Koza-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 123 days.

(21) Appl. No.: 14/671,586

(22) Filed: Mar. 27, 2015

(65) Prior Publication Data
US 2015/0281550 A1 Oct. 1, 2015

(30) Foreign Application Priority Data

Mar. 31, 2014 (JP) ................. 2014-072637

(51) Int. Cl.
*H04N 5/232* (2006.01)
*H04N 5/247* (2006.01)
*H04N 7/18* (2006.01)
*H04N 1/327* (2006.01)

(52) U.S. Cl.
CPC ..... *H04N 5/23206* (2013.01); *H04N 1/32767* (2013.01); *H04N 5/247* (2013.01); *H04N 7/181* (2013.01); *H04N 2201/0015* (2013.01); *H04N 2201/0039* (2013.01); *H04N 2201/3205* (2013.01)

(58) Field of Classification Search
CPC .. H04N 1/32; H04N 1/32005; H04N 1/32016; H04N 1/32026; H04N 1/32502–1/32534; H04N 1/32545–1/3255; H04N 1/32561; H04N 1/32571–1/32587; H04N 1/333–1/33392; H04N 1/00129; H04N 1/00204; H04N 1/00244; H04N 1/00278; H04N 2201/0039; H04N 2201/0044; H04N 2201/0049; H04N 5/23206
See application file for complete search history.

(56) References Cited

U.S. PATENT DOCUMENTS

| 6,734,994 B2* | 5/2004 | Omori | G06F 3/1288 358/1.13 |
| 2012/0239830 A1* | 9/2012 | Sugimura | G06F 3/14 710/29 |
| 2015/0036168 A1* | 2/2015 | Oguro | G06F 3/1205 358/1.14 |

FOREIGN PATENT DOCUMENTS

JP 2005-130423 A 5/2005
JP 2012-222580 A 11/2012

* cited by examiner

*Primary Examiner* — Paul Berardesca
(74) *Attorney, Agent, or Firm* — Cowan, Liebowitz & Latman, P.C.

(57) ABSTRACT

A control apparatus capable of controlling a plurality of apparatuses including at least one image output apparatus that outputs image data and at least one image input apparatus into which image data are input, includes: a first obtaining unit configured to obtain, from one of a first apparatus that serves as the image input apparatus among the plurality of apparatuses and a second apparatus that serves as the image output apparatus among the plurality of apparatuses and outputs image data input into the first apparatus, pair information identifying the first apparatus and the second apparatus; and a control unit configured to perform interlock control of the first apparatus and the second apparatus on the basis of the pair information.

16 Claims, 18 Drawing Sheets

FIG. 4A

| INPUT TERMINAL | CONNECTION CONDITION | CONNECTED APPARATUS |
|---|---|---|
| 1 | INACTIVE | CAMERA A |
| 2 | ACTIVE | CAMERA B |
| 3 | INACTIVE | — |
| 4 | INACTIVE | — |

FIG. 4B

| INPUT TERMINAL | CONNECTION CONDITION | CONNECTED APPARATUS |
|---|---|---|
| 1 | INACTIVE | CAMERA A |
| 2 | INACTIVE | CAMERA B |
| 3 | INACTIVE | — |
| 4 | INACTIVE | — |

FIG. 4C

| INPUT TERMINAL | CONNECTION CONDITION | CONNECTED APPARATUS |
|---|---|---|
| 1 | ACTIVE | CAMERA A |
| 2 | INACTIVE | CAMERA B |
| 3 | INACTIVE | — |
| 4 | INACTIVE | — |

FIG. 6

| APPARATUS INFORMATION (MONITOR) | | | APPARATUS INFORMATION (CONNECTED APPARATUS) | | |
| --- | --- | --- | --- | --- | --- |
| APPARATUS NAME | IP ADDRESS | UUID | APPARATUS NAME | IP ADDRESS | UUID |
| MONITOR A | 192.168.0.101 | 11111111-2222-3333-4444-000000000001 | CAMERA B | 192.168.0.202 | 55555555-6666-7777-8888-000000000002 |
| MONITOR B | 192.168.0.102 | 11111111-2222-3333-4444-000000000002 | CAMERA E | 192.168.0.205 | 55555555-6666-7777-8888-000000000005 |
| MONITOR C | 192.168.0.103 | 11111111-2222-3333-4444-000000000003 | — | — | — |

FIG. 9

| MONITOR A | CAMERA B | SHARED FORMATS |
|---|---|---|
| ITU-R REC. BT.709<br>DCI<br>ITU-R REC. BT.2020 | ITU-R REC. BT.709<br>DCI | ITU-R REC. BT.709<br>DCI |

FIG. 13

| APPARATUS INFORMATION (MONITOR) | | | APPARATUS INFORMATION (CONNECTED APPARATUS) | | | |
|---|---|---|---|---|---|---|
| APPARATUS NAME | IP ADDRESS | UUID | APPARATUS NAME | MODEL NAME | IP ADDRESS | UUID |
| MONITOR A | 192.168.0.101 | 11111111-2222-3333-4444-000000000001 | CAMERA B | MODEL A | 192.168.0.202 | 55555555-6666-7777-8888-000000000002 |
| MONITOR B | 192.168.0.102 | 11111111-2222-3333-4444-000000000002 | CAMERA E | MODEL B | 192.168.0.205 | 55555555-6666-7777-8888-000000000005 |
| MONITOR C | 192.168.0.103 | 11111111-2222-3333-4444-000000000003 | — | — | — | — |

FIG. 16

| APPARATUS INFORMATION (MONITOR) | | | APPARATUS INFORMATION (CONNECTED APPARATUS) | | |
|---|---|---|---|---|---|
| APPARATUS NAME | IP ADDRESS | UUID | APPARATUS NAME | IP ADDRESS | UUID |
| MONITOR A | 192.168.0.101 | 11111111-2222-3333-4444-000000000001 | CAMERA A | 192.168.0.201 | 55555555-6666-7777-8888-000000000001 |
| MONITOR A | 192.168.0.101 | 11111111-2222-3333-4444-000000000001 | CAMERA B | 192.168.0.202 | 55555555-6666-7777-8888-000000000002 |
| MONITOR B | 192.168.0.102 | 11111111-2222-3333-4444-000000000002 | CAMERA E | 192.168.0.205 | 55555555-6666-7777-8888-000000000005 |
| MONITOR C | 192.168.0.103 | 11111111-2222-3333-4444-000000000003 | — | — | — |

FIG. 18

| MONITOR A | CAMERA A | CAMERA B | SHARED FORMATS |
|---|---|---|---|
| ITU-R REC. BT.709 | ITU-R REC. BT.709 | ITU-R REC. BT.709 | ITU-R REC. BT.709 |
| DCI | DCI | DCI | DCI |
| ITU-R REC. BT.2020 | ITU-R REC. BT.2020 | | |

CONTROL APPARATUS, IMAGE INPUT APPARATUS, AND CONTROL METHODS THEREOF

BACKGROUND OF THE INVENTION

Field of the Invention

The present invention relates to a control apparatus, an image input apparatus, and control methods thereof.

Description of the Related Art

Recently, images are produced by photographing image data in various formats. For example, image data having a wide dynamic range (HDR (High Dynamic Range) image data) may be photographed. Accordingly, apparatuses that are suitable for inputting and outputting image data in various formats are used as a photographic apparatus (a camera) and an image display apparatus (a monitor) during image production. The format of the input and output image data is typically switched in response to a user operation (a user operation to set operating modes of the apparatuses, for example). To display image data output from the camera accurately on the monitor, an operating mode that is suitable for inputting the image data output from the camera must be set as the operating mode of the monitor. The operating mode of the monitor must therefore be modified in interlock with modification of the operating mode of the camera. For example, when the operating mode of the camera is switched to an operating mode for photographing and outputting HDR image data, the operating mode of the monitor must be switched to an operating mode that is suitable for inputting HDR image data.

Japanese Patent Application Publication No. 2005-130423, for example, discloses a technique for performing interlock control of a plurality of apparatuses. Japanese Patent Application Publication No. 2005-130423 discloses a home network system in which a control target apparatus such as an air conditioner is controlled in accordance with a condition of a monitoring target apparatus such as a thermometer on the basis of execution rules.

Incidentally, cases in which a highly portable and user-friendly tablet terminal is used as a controller for controlling a camera and a monitor are increasing. When a camera and a monitor is controlled using a tablet terminal, the tablet terminal is connected to the camera and the monitor via a wireless LAN.

However, a plurality of cameras and a plurality of monitored may be connected to the tablet terminal. In this case, to perform interlock control of the cameras and the monitors, a camera and a monitor which are targets of interlock control must be selected from the plurality of cameras and the plurality of monitors.

Japanese Patent Application Publication No. 2012-222580, for example, discloses a technique with which a network configuration can be determined easily. In the technique disclosed in Japanese Patent Application Publication No. 2012-222580, information relating to apparatuses (upper order apparatuses) on a network and information relating to apparatuses (lower order apparatuses) connected to the upper order apparatuses are displayed so that the upper order apparatuses can be distinguished from the lower order apparatuses.

However, a plurality of cameras may be connected to a monitor, and not all of the plurality of cameras are necessarily targets of interlock control. Therefore, even when the technique disclosed in Japanese Patent Application Publication No. 2012-222580 is used, in a case where a plurality of cameras are connected to a monitor, a user must manually select the camera which is a target of interlock control from the plurality of cameras. As a result, a load placed on the user increases, and a camera may be selected erroneously.

SUMMARY OF THE INVENTION

The present invention provides a technique with which interlock control of a plurality of apparatuses can be performed easily and accurately.

The present invention in its first aspect provides a control apparatus capable of controlling a plurality of apparatuses including at least one image output apparatus that outputs image data and at least one image input apparatus into which image data are input, comprising:

a first obtaining unit configured to obtain, from one of a first apparatus that serves as the image input apparatus among the plurality of apparatuses and a second apparatus that serves as the image output apparatus among the plurality of apparatuses and outputs image data input into the first apparatus, pair information identifying the first apparatus and the second apparatus; and a control unit configured to perform interlock control of the first apparatus and the second apparatus on the basis of the pair information.

The present invention in its second aspect provides an image input apparatus into which image data are input, comprising:

a third obtaining unit configured to obtain, from an image output apparatus that outputs the image data input into the image input apparatus, identification information identifying the image output apparatus;

a generating unit configured to generate pair information identifying the image input apparatus and the image output apparatus that outputs the image data input into the image input apparatus on the basis of the identification information obtained by the third obtaining unit; and a second outputting unit configured to output the pair information.

The present invention in its third aspect provides a control method for a control apparatus that is capable of controlling a plurality of apparatuses including at least one image output apparatus that outputs image data and at least one image input apparatus into which image data are input, comprising:

a first obtaining step of obtaining, from one of a first apparatus that serves as the image input apparatus among the plurality of apparatuses and a second apparatus that serves as the image output apparatus among the plurality of apparatuses and outputs image data input into the first apparatus, pair information identifying the first apparatus and the second apparatus; and a control step of performing interlock control of the first apparatus and the second apparatus on the basis of the pair information.

The present invention in its fourth aspect provides a control method for an image input apparatus into which image data are input, comprising:

a third obtaining step of obtaining, from an image output apparatus that outputs the image data input into the image input apparatus, identification information identifying the image output apparatus;

a generating step of generating pair information identifying the image input apparatus and the image output apparatus that outputs the image data input into the image input apparatus on the basis of the identification information obtained in the third obtaining step; and a second outputting step of outputting the pair information.

The present invention in its fifth aspect provides a non-transitory computer readable medium that stores a program, wherein the program causes a computer to execute the control method for the control apparatus.

The present invention in its sixth aspect provides a non-transitory computer readable medium that stores a program, wherein the program causes a computer to execute the control method for the image input apparatus.

According to the present invention, interlock control of a plurality of apparatuses can be performed easily and accurately.

Further features of the present invention will become apparent from the following de script ion of exemplary embodiments with reference to the attached drawings.

BRIEF DESCRIPTION OF THE DRAWINGS

FIGS. 4A to 4C are views showing examples of connection conditions and connected apparatuses of input terminals of the monitor according to the first embodiment;

FIG. 6 is a view showing an example of apparatus management information according to the first embodiment;

FIG. 9 is a view showing examples of shared formats according to the first embodiment;

FIG. 13 is a view showing an example of apparatus management information according to the second embodiment;

FIG. 16 is a view showing an example of apparatus management information according to the third embodiment;

FIG. 18 is a view showing examples of shared formats according to the third embodiment.

DESCRIPTION OF THE EMBODIMENTS

A system according to embodiments of the present invention will be described below with reference to the drawings. Note, however, that the configurations described in the following embodiments are merely examples, and the present invention may be modified appropriately within a scope that does not depart from the technical spirit thereof.

(First Embodiment)

A system according to a first embodiment of the present invention will now be described with reference to the drawings.

Figure 1:
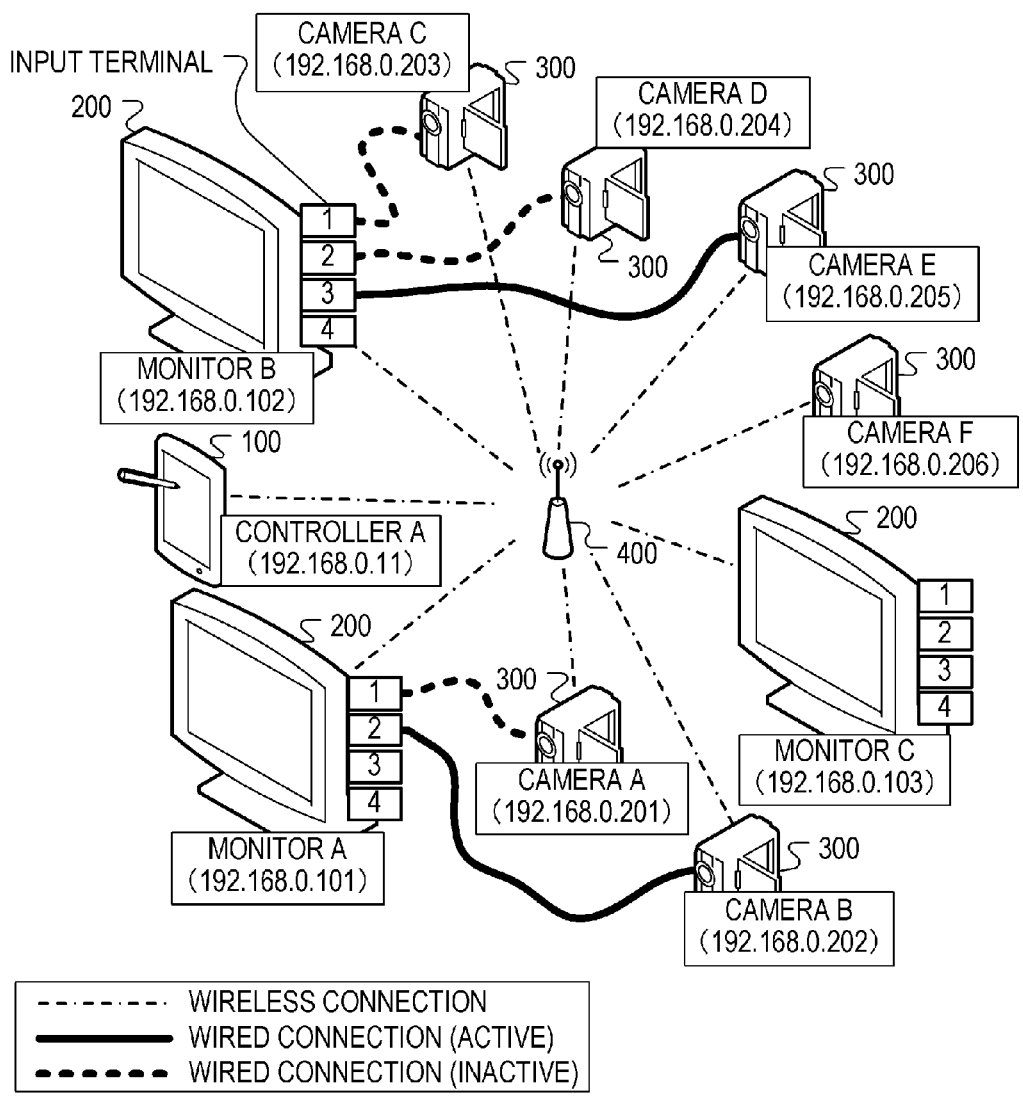
FIG. 1 is a view showing an example of a connection configuration of a system according to a first embodiment.

FIG. 1 is a view showing an example of a connection configuration of the system according to this embodiment. As shown in FIG. 1, the system according to this embodiment includes a controller 100, a monitor 200, a camera 300, and an access point 400. The controller 100, the monitor 200, the camera 300, and the access point 400 together constitute a wireless LAN (Local Area Network). The controller 100, the monitor 200, and the camera 300 are connected to each other communicably. More specifically, the controller 100, the monitor 200, and the camera 300 are connected wirelessly to the access point 400. Communication between the controller 100, the monitor 200, and the camera 300 is performed by the access point 400.

Note that the monitor 200 and the camera 300 may be connected to the controller 100 without passing through the access point 400. In this case, the access point 400 is not required.

The controller 100 is a control apparatus capable of controlling a plurality of apparatuses including the monitor 200 and the camera 300. More specifically, the controller 100 is capable of controlling a plurality of apparatuses connected to the access point 400.

The monitor 200 is an image input apparatus into which image data are input. More specifically, the monitor 200 is an image display apparatus that displays input image data on a screen.

The camera 300 is an image output apparatus that outputs image data. More specifically, the camera 300 is a photographic apparatus that generates image data through photography and outputs the generated image data.

In the example of FIG. 1, a single controller A serving as the controller 100, three monitors A to C serving as the monitor 200, and six cameras A to F serving as the camera 300 exist on the same network.

An IP address 192.168.0.11 is allocated to the controller A. IP addresses 192.168.0.101 to 192.168.0.103 are allocated respectively to the monitors A to C. IP addresses 192.168.0.201 to 192.168.0.206 are allocated respectively to the cameras A to F.

The monitor A includes four input terminals 1 to 4 to which external apparatuses can be connected. The camera A is connected to the input terminal 1 of the monitor A, and the camera B is connected to the input terminal 2 of the monitor A. No cameras 300 are connected to the input terminals 3, 4 of the monitor A. An SDI (Serial Digital Interface) cable is used to connect the monitor 200 to the camera 300. Image data output from the camera 300 are input into the input terminal of the monitor 200 through the SDI cable. Further, respective connection conditions of the input terminals 1, 3, 4 of the monitor A are set at "inactive", whereas the connection condition of the input terminal 2 of the monitor A is at "active". When the connection condition is "inactive", this means that no image data are being input, and when the connection condition is "active", this means that image data are being input. Here, the image data output from the camera 300 are not limited to photographed image data (photographic data). For example, image data of a menu image and an activation image are output from the camera 300 before outputting the photographic data.

The monitor 200 displays the input image data on a screen. Hence, the "inactive" connection condition may also mean that image data are not being used for image display, and the "active" connection condition may mean that image data are being used for image display. In the example of FIG. 1, the connection condition of the input terminal 2 of the monitor A is "active", which means that image data output from the camera B are being displayed on the monitor A.

Note that the monitor 200 may select the input terminal in which to receive input image data from the plurality of input terminals. In this case, the "inactive" connection condition may also mean that input image data are not being received, and the "active" connection condition may mean that input image data are being received. For example, the monitor 200 may select the input terminal in which to receive input image data from the plurality of input terminals in response to a user operation.

The monitor B likewise includes input terminals 1 to 4. The camera C is connected to the input terminal 1 of the monitor B, the camera D is connected to the input terminal 2 of the monitor B, and the camera E is connected to the input terminal 3 of the monitor B. No camera 300 is connected to the input terminal 4 of the monitor B. The respective connection conditions of the input terminals 1, 2, 4 of the monitor B are set at "inactive", and the connection condition of the input terminal 3 of the monitor B is set at "active". This means that image data output from the camera E are being displayed on the monitor B.

The monitor C also includes input terminals 1 to 4. However, no cameras 300 are connected to any of the input terminals 1 to 4 of the monitor C. Therefore, the connection conditions of the input terminals 1 to 4 of the monitor C are all set at "inactive".

The camera F is not connected to the monitor 200.

The monitor 200 and the camera 300 can each be set in a plurality of operating modes (signal modes). For example, the plurality of operating modes of the monitor 200 are constituted by a plurality of input modes in which the image data envisaged as the input image data are input in respectively different formats. Further, the plurality of operating modes of the camera 300 are constituted by a plurality of output modes in which the image data are output in different formats. The operating modes of the monitor 200 and the camera 300 can be modified using the controller 100. More specifically, the controller 100 can modify the operating modes of the monitor 200 and the camera 300 by controlling the monitor 200 and the camera 300 via the access point 400.

In FIG. 1, the camera B is set in an output mode for outputting image data in a color gamut prescribed by ITU-R (International Telecommunication Union Radiocommunication sector) Rec. BT. 709. Further, the monitor A is set in an input mode that is suitable for inputting image data in the color gamut prescribed by ITU-R Rec. BT. 709.

Here, when the output mode of the camera B is switched to an output mode for outputting image data in a color gamut prescribed by DCI (Digital Cinema Initiatives), image data having a wider color gamut than image data generated by ITU-R Rec. BT. 709 can be displayed on the monitor 200 as a result of the photography performed by the camera B. In this case, however, the input mode of the monitor A that displays the image data output from the camera B must be switched to an input mode that is suitable for inputting image data in the color gamut prescribed by DCI.

To set DCI-compatible operating modes in both the monitor A and the camera B, the controller A must specify a combination of "monitor A and camera B". In the configuration shown in FIG. 1, however, a plurality of cameras 300 (the camera A and the camera B) are connected to the monitor A, and it is therefore difficult to specify a combination of the monitor A and the camera B.

Hence, in this embodiment, the controller 100 obtains pair information from the monitor 200. The pair information is information identifying a first apparatus and a second apparatus. The first apparatus is the monitor 200, from among the plurality of apparatuses constituting the LAN, and the second apparatus is the camera 300, from among the plurality of apparatuses constituting the LAN, that outputs the image data input into the first apparatus. It may be said that the second apparatus is the camera 300 that is connected to the input terminal (the input terminal of the first apparatus) set in the "active" connection condition. The camera 300 that is connected to the input terminal set in the "active" connection condition will be referred to hereafter as "the camera 300 having an active connection to the monitor 200". In this embodiment, information including the IP address of the first apparatus and the IP address of the second apparatus is obtained as the pair information. The controller 100 can perform interlock control of a plurality of apparatuses easily and accurately using the pair information. More specifically, by referring to the pair information, the controller 100 can specify an appropriate combination of a monitor 200 and a camera 300 which are targets of interlock control easily and accurately. The controller 100 can then establish communication with the appropriate monitor 200 and camera 300 which are targets of interlock control, and perform interlock control of the monitor 200 and the camera 300.

Note that the image display apparatus is not limited to an apparatus having a screen, such as a liquid crystal display apparatus, an organic EL display apparatus, a plasma display apparatus, and so on. The image display apparatus may be an apparatus (a projector, for example) that displays images on a roll screen. Further, the image input apparatus is not limited to an image display apparatus. For example, the image input apparatus may be an image processing apparatus that applies image processing to input image data. Furthermore, the image input apparatus may be an image-forming apparatus (a printer, for example) that forms an image based on input image data on a recording material. Moreover, the image input apparatus may be an image recording apparatus (a hard disk recorder, a Blu-ray disc recorder, a personal computer, and so on) that records input image data on a storage medium (a magnetic disc, an optical disc, a semiconductor memory, and so on).

Note that the image output apparatus is not limited to a photographic apparatus. For example, the image output apparatus may be apparatus (a recorder, a player, a personal computer, and so on) that outputs image data read from a storage medium to the outside.

The system according to this embodiment may include apparatuses other than the controller 100, the monitor 200, and the camera 300. Numbers of the controller 100, the monitor 200, and the camera 300 may be larger or smaller than those shown in FIG. 1.

The pair information may be obtained from the camera 300. The pair information may be obtained from one or both of the monitor 200 and the camera 300.

Note that the information included in the pair information is not limited to an IP address, and any information from which the first apparatus and the second apparatus can be identified may be used. For example, the pair information may include information other than an IP address as identification information of the apparatuses. More specifically, the pair information may include, as the identification information of the apparatuses, apparatus names, model numbers, serial numbers, another identifier of the apparatuses, and so on.

Figure 2:
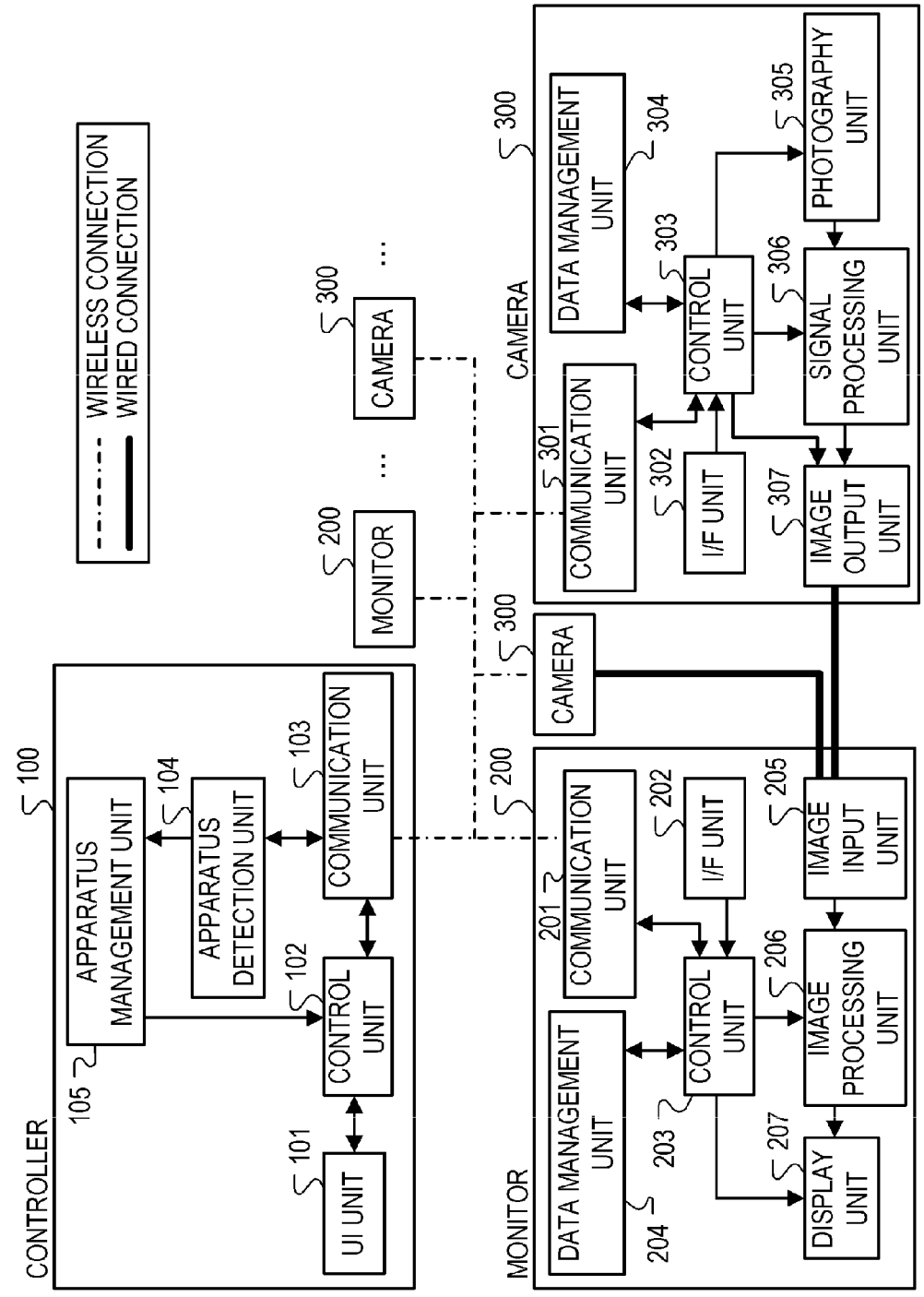
FIG. 2 is a block diagram showing an example of a configuration of the system according to the first embodiment.

FIG. 2 is a block diagram showing an example of the configuration of the system according to this embodiment. Examples of configurations of the controller 100, the monitor 200, and the camera 300 will be described below using FIG. 2.

(Configuration of Controller)

The configuration of the controller 100 will now be described.

A UI unit 101 is an operation unit (a user interface) that receives user operations performed on the controller 100. Buttons or a touch panel, for example, may be used as the UI unit 101. When a user operation is performed on the controller 100, the UI unit 101 outputs an operation signal corresponding to the user operation to a control unit 102.

The control unit 102 executes processing corresponding to the operation signal from the UI unit 101. For example, when the user performs an operation to perform interlock control of the monitor 200 and the camera 300, the control unit 102 performs interlock control of the monitor 200 and the camera 300 by transmitting a control command to the monitor 200 and the camera 300 via a communication unit 103 to be described below. In this embodiment, interlock control of the first apparatus and the second apparatus identified by the pair information are performed on the basis of the pair information, which is managed by an apparatus management unit 105 to be described below.

The communication unit 103 is a communication interface for connecting the controller 100 to the monitor 200 and the camera 300 wirelessly to be capable of communication.

An apparatus detection unit 104 detects the monitors 200 existing on the same network as the controller 100 via the communication unit 103. The apparatus detection unit 104 also obtains the pair information from the detected monitors 200 via the communication unit 103 (first acquisition processing). The apparatus detection unit 104 then records the obtained pair information in the apparatus management unit 105 to be described below.

The apparatus management unit 105 manages the pair information obtained by the apparatus detection unit 104.

Note that the apparatus detection unit 104 may also detect the cameras 300 existing on the same network as the controller 100. The apparatus detection unit 104 may then obtain identification information (apparatus information) identifying the detected apparatuses from each apparatus, and record the obtained identification information in the apparatus management unit 105.

(Configuration of Monitor)

The configuration of the monitor 200 will now be described.

A communication unit 201 is a communication interface for connecting the monitor 200 to the controller 100 and the camera 300 wirelessly to be capable of communication.

An I/F unit 202 is an operation unit (a user interface) that receives user operations performed on the monitor 200. When the user performs an operation on the monitor 200, the I/F unit 202 outputs an operation signal corresponding to the user operation to a control unit 203.

The control unit 203 executes processing corresponding to the operation signal from the I/F unit 202. The control unit 203 also executes processing corresponding to a control command received from the controller 100 via the communication unit 201. Further, the control unit 203 selects one of a plurality of input modes managed by a data management unit 204 to be described below, and sets the selected input mode. Furthermore, the control unit 203 generates pair information from apparatus information (apparatus information of the camera 300) obtained from the camera 300 via an image input unit 205 to be described below and apparatus information of the monitor 200, which is managed by the data management unit 204 to be described below. Pair information identifying the monitor 200 and the camera 300 having an active connection to the monitor 200 is generated by the control unit 203. The control unit 203 then records the generated pair information in the data management unit 204. The control unit 203 also outputs the pair information managed by the data management unit 204 to the controller 100 via the communication unit 201 (second output processing). The control unit 203 generates the pair information and updates the pair information managed by the data management unit 204, to be described below, every time the connection condition between the monitor 200 and the camera 300 changes.

The data management unit 204 manages the apparatus information of the monitor 200, the pair information generated by the control unit 203, the plurality of input modes that can be set by the monitor 200, and so on. In this embodiment, an apparatus name, the IP address, and a UUID (Universally Unique IDentifier) of the monitor 200 are managed as the apparatus information of the monitor 200.

Note that the apparatus information may include information other than the apparatus name, the IP address, and the UUID. For example, the apparatus information may include the model number and serial number of the apparatus.

The image input unit 205 is an interface that receives the image data output from the camera 300. As well as the image data, the image input unit 205 obtains apparatus information identifying the image output apparatus (the camera 300) that outputted the image data input into the monitor 200 from the image output apparatus (third acquisition processing). Further, the image input unit 205 monitors the condition of data (a signal) input from the outside, and when the condition of the data changes, notifies the control unit 203 of the change in the condition of the data. For example, when the active input terminal is switched to another terminal as a result of a user operation performed on the camera 300, a connection switch between the camera 300 and the monitor 200, or the like, the image input unit 205 notifies the control unit 203 that the active input terminal has been switched.

An image processing unit 206 generates image data for display by applying image processing to the image data input into the image input unit 205. The image processing is correction processing for correcting a gamma value and the color gamut, for example. For example, the control unit 203 notifies the image processing unit 206 of the set input mode. The image processing unit 206 executes image processing corresponding to the set input mode. The image processing unit 206 then outputs the image data for display to a display unit 207 to be described below.

The display unit 207 displays the image data for display, output from the image processing unit 206, on a screen. A liquid crystal display panel, an organic EL display panel, a plasma display panel, or the like may be used as the display unit 207.

(Configuration of Camera)

The configuration of the camera 300 will now be described.

A communication unit 301 is a communication interface for connecting the camera 300 to the controller 100 and the monitor 200 wirelessly to be capable of communication.

An I/F unit 302 is an operation unit (a user interface) that receives user operations performed on the camera 300. When the user performs an operation on the camera 300, the I/F unit 302 outputs an operation signal corresponding to the user operation to a control unit 303.

The control unit 303 executes processing corresponding to the operation signal from the I/F unit 302. The control unit 303 also executes processing corresponding to a control command received from the controller 100 or the monitor 200 via the communication unit 301. Further, the control unit 303 selects one of a plurality of output modes managed by a data management unit 304 to be described below, and sets the selected output mode. Furthermore, the control unit 303 transmits the apparatus information of the camera 300, which is managed by the data management unit 304 to be described below, to the monitor 200 via an image output unit 307.

The data management unit 304 manages the apparatus information of the camera 300, the plurality of output modes that can be set by the camera 300, and so on. In this embodiment, the apparatus name, IP address, and UUID of the camera 300 are managed as the apparatus information of the camera 300.

A photography unit 305 is a photographic sensor that converts light from an object into an electric signal. A Bayer array or a CMOS (Complementary Metal-Oxide Semiconductor) sensor, for example, may be used as the photography unit 305.

A signal processing unit 306 generates image data by applying debayering processing to the electric signal output from the photography unit 305. The signal processing unit 306 also generates image display for output by applying image processing to the image data obtained as a result of the debayering processing. For example, the control unit 303 notifies the signal processing unit 306 of the set output mode. The signal processing unit 306 executes image processing corresponding to the set output mode. The signal processing unit 306 then outputs the image data for output to the image output unit 307 to be described below.

The image output unit 307 is an interface for outputting the image data (the image data for output) output from the signal processing unit 306 to the monitor 200.

(Operation of Monitor)

In the configuration shown in FIG. 1, the monitor A obtains apparatus information from the camera B connected to the input terminal 2 that is in the "active" connection condition. Next, the monitor A generates pair information identifying the monitor A and the camera B on the basis of the apparatus information of the camera B. More specifically, the monitor A generates pair information including the IP address of the monitor A and the IP address of the camera B. The monitor A then manages (stores) the generated pair information. Further, when the input terminal in the "active" connection condition is switched from the input terminal 2 to the input terminal 1, the monitor A obtains apparatus information from the camera A connected to the input terminal 1, and generates pair information identifying the monitor A and the camera A on the basis of the apparatus information of the camera A. The monitor A then updates the managed pair information to the pair information identifying the monitor A and the camera A.

An example of an operation of the monitor 200 (an operation performed by the monitor 200 to generate and manage the pair information) will be described below using a flowchart shown in FIG. 3.

First, the control unit 203 receives from the image input unit 205 a condition change notification indicating that the connection conditions of the input terminals of the monitor 200 have changed (S11). A change in the connection conditions of the input terminals occurs when "external input is started", when "external input is stopped", when the "input is switched", and so on, for example.

"External input is started" when, for example, a camera 300 in which a power supply is switched "ON" is connected to the monitor 200 via an image transmission cable. Further, "external input is started" when the power supply of the camera 300 connected to the monitor 200 via the image transmission cable is switched from "OFF" to "ON". The image transmission cable is an SDI cable, for example. When "external input is started", a signal condition of the input terminal of the monitor 200 changes from a "non-signal condition" to a "signal input condition". For example, when the power supply of the camera 300 connected to the monitor 200 is switched from "OFF" to "ON", image data such as a menu image and an activation image are output to the monitor 200 from the camera 300. As a result, the signal condition of the input terminal of the monitor 200 changes from the "non-signal condition" to the "signal input condition". The "non-signal condition" is a condition in which no image data are input, and corresponds to the "inactive" connection condition. The "signal input condition" is a condition in which image data are input, and corresponds to the "active" connection condition. In FIG. 1, it is assumed that the power supply of the camera B connected to the input terminal 2 of the monitor 200 is switched from "OFF" to "ON" by a user operation (a user operation performed on the camera B or the controller A). In this case, the connection condition of the input terminal 2 of the monitor A changes from "inactive" to "active". In other words, the connection condition of the input terminal 2 of the monitor A changes from a condition shown in FIG. 4B to a condition shown in FIG. 4A. FIGS. 4A to 4C are views showing examples of the connection conditions and connected apparatuses (the apparatuses connected to the input terminals) of the respective input terminals of the monitor A. It is also assumed that the camera B, in which the power supply is "ON", is connected to the input terminal 2 of the monitor A. Likewise in this case, the connection condition of the input terminal 2 of the monitor A changes from "inactive" to "active".

"External input is stopped" when, for example, the image transmission cable used to connect the camera 300 in which the power supply is "ON" to the monitor 200 is detached from the monitor 200 or the camera 300. Further, "external input is stopped" when the power supply of the camera 300 connected to the monitor 200 via the image transmission cable is switched from "ON" to "OFF". When "external input is stopped", the connection condition of the input terminal changes from "active" to "inactive". In FIG. 1, for example, it is assumed that the power supply of the camera B connected to the input terminal 2 of the monitor 200 is switched from "ON" to "OFF" by a user operation (a user operation performed on the camera B or the controller A). In this case, the connection condition of the input terminal 2 of the monitor A changes from "active" to "inactive". In other words, the connection condition of the input terminal 2 of the monitor A changes from the condition shown in FIG. 4A to the condition shown in FIG. 4B. It is also assumed that the image transmission cable used to connect the camera B, in which the power supply is "ON", to the monitor A is detached from the input terminal 2 of the monitor A or from the camera B. Likewise in this case, the connection condition of the input terminal 2 of the monitor A changes from "active" to "inactive".

The "input is switched" when the input terminal that receives input image data (the input terminal in the "active" connection condition) is switched to another input terminal of the monitor 200. The input terminal in the "active"

connection condition is switched in response to a user operation performed on the monitor 200 or the controller A, for example. In FIG. 1, when the user performs an operation to switch the active terminal of the monitor A from the input terminal 2 to the input terminal 1, the connection condition of the input terminal 2 of the monitor A changes from "active" to "inactive", and the connection condition of the input terminal 1 of the monitor A changes from "inactive" to "active". In other words, the respective connection conditions of the input terminals 1, 2 of the monitor A change from the condition shown in FIG. 4A to the condition shown in FIG. 4C.

Following S11, the control unit 203 determines whether or not the condition change notification received in S11 is a notification indicating that external input has been stopped (S12). When the condition change notification is a notification indicating that external input has been stopped, the processing advances to S17, and when the condition change notification is not a notification indicating that external input has been stopped, the processing advances to S13. For example, the processing advances to S13 when the condition change notification is a notification indicating that external input has been started or that the input has been switched.

In S13, the control unit 203 specifies (detects) the input terminal in the "active" connection condition. In the example of FIG. 4A, the input terminal 2 is detected as the input terminal in the "active" connection condition. In the example of FIG. 4C, the input terminal 1 is detected as the input terminal in the "active" connection condition.

Next, the control unit 203 obtains the apparatus information of the camera 300 (the apparatus name, IP address, and UUID of the camera 300) that is connected to the input terminal specified in S13 from the camera 300 (S14). In this embodiment, the camera 300 outputs a signal including the image data and the apparatus information. The control unit 203 obtains the apparatus information from the signal (the signal output from the camera 300) input into the input terminal specified in S13. For example, the camera 300 outputs an SDI signal describing the apparatus information to an ancillary area. The control unit 203 obtains the apparatus information from the ancillary area of the SDI signal.

Note that a cable that enables bidirectional communication (a display port cable, an HDMI cable, or the like) may be used as the image transmission cable that connects the monitor 200 and the camera 300 to each other. In this case, the control unit 203 of the monitor 200 may output an apparatus information acquisition request to the camera 300 via the image input unit 205 and the image transmission cable. The control unit 303 of the camera 300 can then output the apparatus information in response to the acquisition request. The apparatus information acquisition request is input into the control unit 303 via the image transmission cable and the image output unit 307. The apparatus information of the camera 300 is then output to the monitor 200 via the image output unit 307 and the image transmission cable.

Following S14, the control unit 203 obtains the apparatus information of the monitor 200 (the apparatus name, IP address, and UUID of the monitor 200) from the data management unit 204 (S15).

The control unit 203 then generates the pair information on the basis of the apparatus information of the camera 300, obtained in S14, and the apparatus information of the monitor 200, obtained in S15 (S16). The control unit 203 records the generated pair information in the data management unit 204. Note that when pair information generated in the past is stored in (managed by) the data management unit 204, the control unit 203 deletes the pair information generated in the past from the data management unit 204. In other words, when pair information generated in the past is managed by the data management unit 204, the control unit 203 updates the pair information managed by the data management unit 204.

In S16, as shown in FIG. 6, information associating the apparatus information of the camera 300, obtained in S14, with the apparatus information of the monitor 200, obtained in S15, is generated as the pair information. FIG. 6 shows an example of a case in which the camera 300 having an active connection to the monitor A is the camera B, the camera 300 having an active connection to the monitor B is the camera E, and no camera 300 has an active connection to the monitor C. In the example of FIG. 6, therefore, pair information identifying the monitor A and the camera B is generated in the monitor A, and pair information identifying the monitor B and the camera E is generated in the monitor B. No pair information is generated in the monitor C. Note that pair information identifying the monitor C may be generated in the monitor C.

In S17, the control unit 203 deletes the pair information stored in (managed by) the data management unit 204. Note that in S17, the control unit 203 may update the pair information stored in the data management unit 204 to pair information identifying only the monitor 200.

Hence, pair information identifying the monitor 200 and the camera 300 having an active connection to the monitor 200 is generated by the monitor 200. Further, the pair information is updated in response to modification of the connection condition between the monitor 200 and the camera 300.

Note that in this embodiment, an example in which a single input terminal of the monitor 200 is used to input the image data from the camera 300 was described, but the present invention is not limited thereto, and a plurality of the input terminals of the monitor 200 may be used to input the image data from the camera 300. For example, four output terminals of the camera 300 may be connected to the four input terminals of the monitor 200 via the image transmission cable. The camera 300 may then generate four sets of divided image data by dividing image data consisting of 3840 pixels in a horizontal direction×2160 pixels in a vertical direction into four. The four sets of divided image data may then be transmitted to the four input terminals of the monitor 200 from the four output terminals of the camera 300. In this case, the four input terminals of the monitor 200 may be considered as a single input terminal such that the connection between the monitor 200 and the camera 300 is determined to be active only when all four input terminals are in the "active" connection condition.

(Operation 1 of Controller)

In the configuration shown in FIG. 1, the monitor A generates and manages pair information including the IP address of the monitor A and the IP address of the camera B. The controller A can determine that the camera 300 having an active connection to the monitor A is the camera B by referring to the pair information in the monitor A. The controller A can then establish communication with the monitor A and the camera B and perform interlock control of the monitor A and the camera B.

Figure 5:
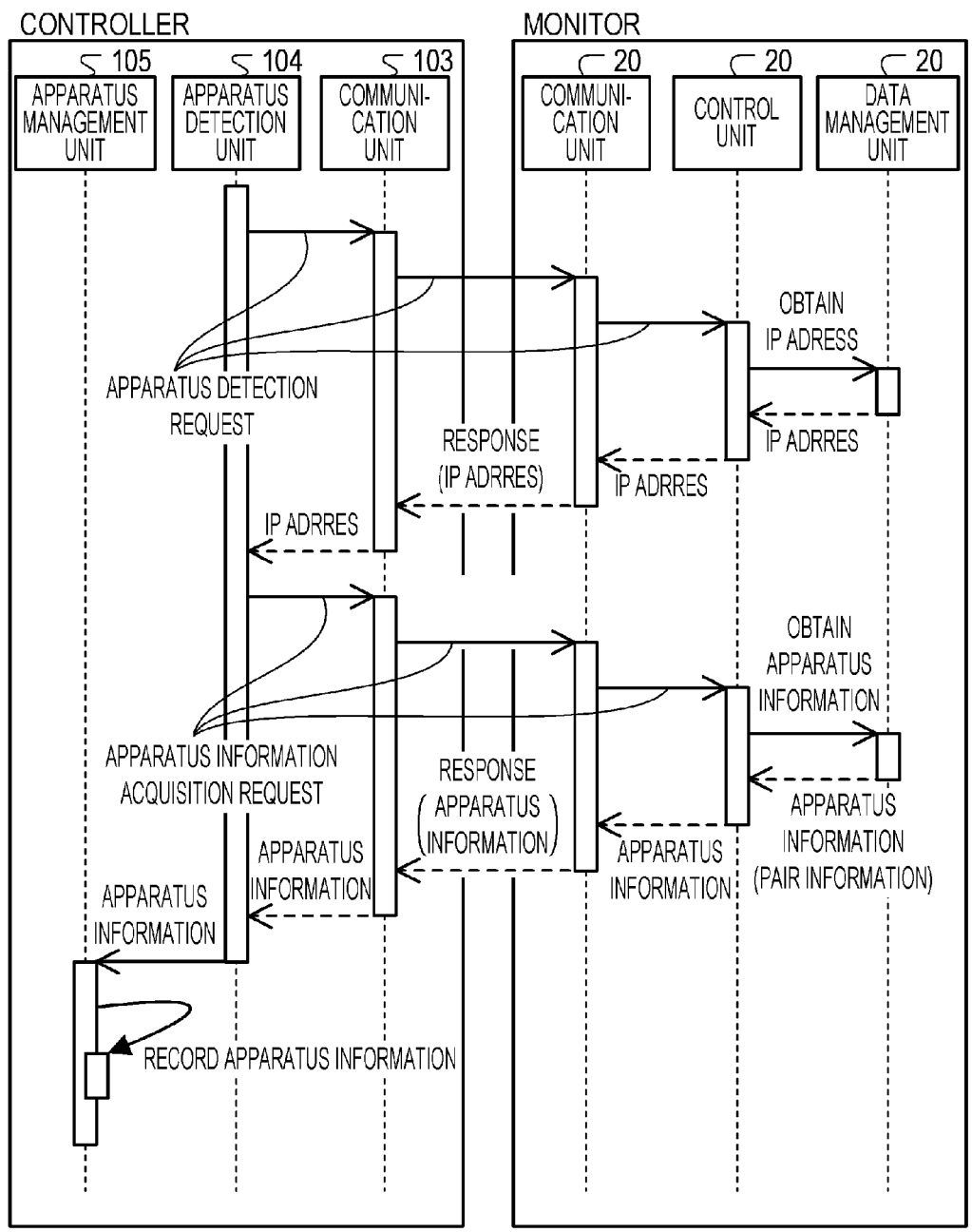
FIG. 5 is a sequence diagram showing an example of an operation of a controller according to the first embodiment.

An example of an operation of the controller 100 (an operation to detect the monitor 200 and obtain the pair information from the monitor 200) will be described below using a sequence diagram shown in FIG. 5.

To facilitate understanding of an operation of the system according to this embodiment, operations of the monitor 200 will also be described below.

First, the apparatus detection unit 104 of the controller 100 transmits an apparatus detection request to the monitor 200 via the communication unit 103. The apparatus detection request is a UPnP (Universal Plug and Play) M-SEARCH message, for example, which is transmitted by multicast to the monitors 200 existing on the same network as the controller 100.

The control unit 203 of the monitor 200 obtains the IP address of the monitor 200 from the data management unit 204 in response to the detection request received via the communication unit 201, and transmits a response message including the obtained IP address to the controller 100 via the communication unit 201.

The apparatus detection unit 104 of the controller 100 receives the response message including the IP address of the monitor 200 from the monitor 200 via the communication unit 103.

Next, the apparatus detection unit 104 of the controller 100 transmits an apparatus information acquisition request to the monitor 200 via the communication unit 103.

The control unit 203 of the monitor 200 obtains the apparatus information from the data management unit 204 in response to the acquisition request received via the communication unit 201, and transmits a response message including the obtained apparatus information to the controller 100 via the communication unit 201. When pair information identifying the monitor 200 and the camera 300 having an active connection to the monitor 200 is stored in the data management unit 204, as in the monitor A in FIG. 6, the control unit 203 transmits a response message including the pair information to the controller 100 as the apparatus information. When no camera 300 has an active connection to the monitor 200, as in the monitor C in FIG. 6, the control unit 203 transmits a response message including the apparatus information of the monitor 200 to the controller 100.

The apparatus detection unit 104 of the controller 100 receives the response message including the apparatus information (or the pair information) of the monitor 200 from the monitor 200 via the communication unit 103.

The apparatus detection unit 104 of the controller 100 then records the apparatus information (or the pair information) included in the received response message in the apparatus management unit 105. When the connection conditions between the monitors 200 and the cameras 300 are as shown in FIG. 1, the information shown in FIG. 6 (the pair information of the monitors A and B and the apparatus information of the monitor C) is recorded in the apparatus management unit 105 of the controller 100.

Hence, the pair information is obtained by the controller 100 while detecting the monitor 200. On the basis of the pair information, the controller 100 can specify an appropriate combination of a monitor 200 and a camera 300 which are targets of interlock control, from among the plurality of apparatuses existing on the same network as the controller 100. More specifically, the IP addresses and apparatus names of the monitor 200 and the camera 300 included in the pair information can be obtained as the information of the appropriate monitor 200 and camera 300 which are targets of interlock control.

(Operation 2 of Controller)

Figure 8:
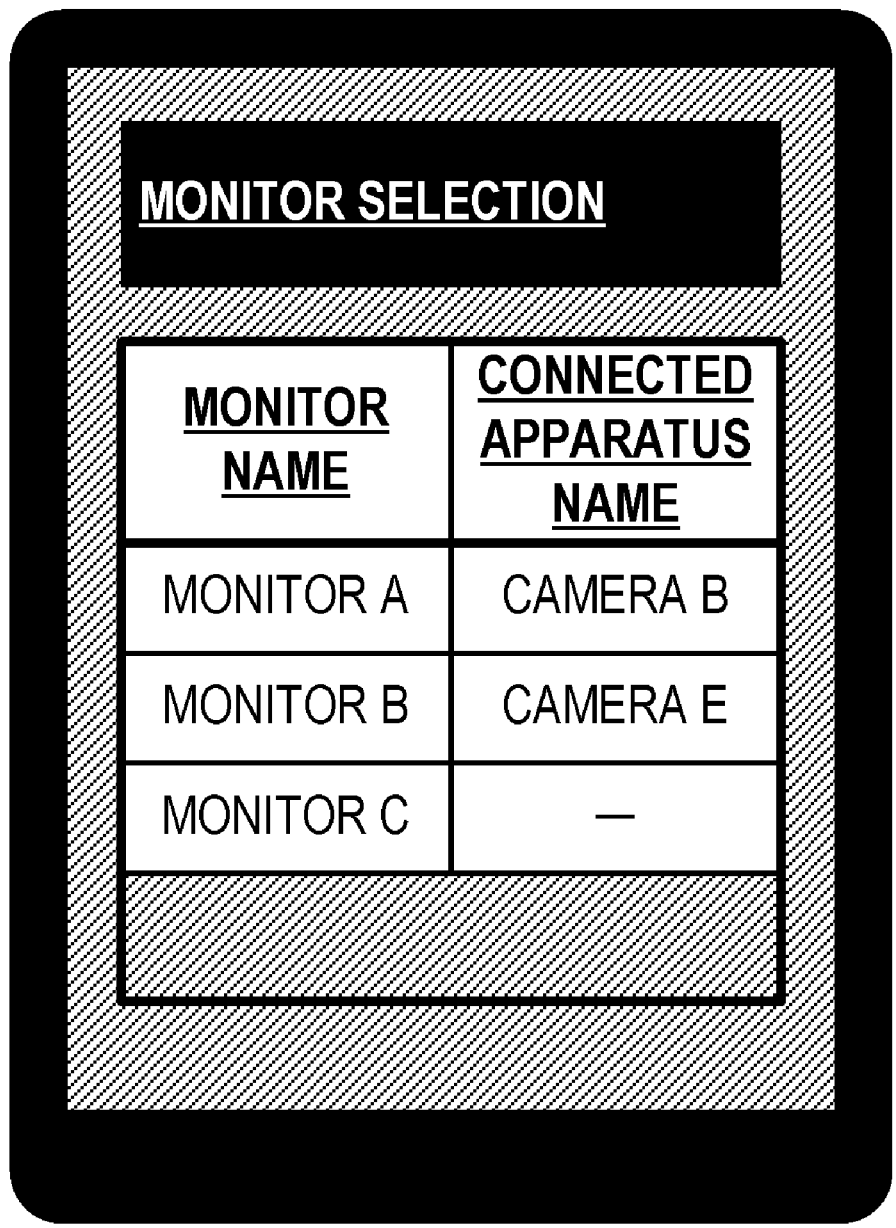
FIG. 8 is a view showing an example of a monitor selection image according to the first embodiment.

In the configuration shown in FIG. 1, the controller A obtains pair information identifying the monitor A and the camera B and pair information identifying the monitor B and the camera E. The controller A also obtains the apparatus information of the monitor C. Accordingly, the controller A can display a monitor selection image shown in FIG. 8 on the screen of the controller A. In the example of FIG. 8, the monitor selection image includes a list of the monitors A to C. On the list, the camera B is shown as the connected apparatus of the monitor A, and the camera E is shown as the connected apparatus of the monitor B. The monitor selection image is an image used by the user to select a control target monitor. When the user selects the monitor A using the monitor selection image, the controller A obtains the IP addresses of the monitor A and the camera B included in the pair information of the monitor A as the IP addresses of the monitor 200 and the camera 300 which are targets of interlock control. The controller A then establishes communication with the monitor A and the camera B using the IP addresses of the monitor A and the camera B included in the pair information of the monitor A. As a result, interlock control of the monitor A and the camera B can be performed.

An example of an operation performed by the controller 100 (an operation to select the control target monitor 200 and establish communication with the control target apparatuses) will be described below using a flowchart shown in FIG. 7.

First, the control unit 102 receives a monitor selection image display request from the UI unit 101 (S21). The UI unit 101 outputs the display request to the control unit 102 in response to a user operation (a user operation performed on the controller 100) for displaying the monitor selection image.

Next, the control unit 102 obtains the information (the apparatus information or the pair information) of the respective monitors from the apparatus management unit 105 in response to the display request received in S21 (S22). More specifically, the information shown in FIG. 6 is obtained. The information shown in FIG. 6 will be referred to hereafter as "apparatus management information".

The control unit 102 generates the monitor selection image (FIG. 8) using the information obtained in S22, and displays the generated monitor selection image on the screen (the screen of the controller 100) (S23).

The monitor selection image shown in FIG. 8 includes two sections, namely "monitor name" and "connected apparatus name". The apparatus names of the respective monitors 200 are described in the "monitor name" section. The apparatus names of the cameras 300 respectively having active connections to the monitors 200 are described in the "connected apparatus name" section. The apparatus names of the monitors 200 and the apparatus names of the cameras 300 are obtained from the information shown in FIG. 6. In the example of FIG. 6, the connection between the monitor A and the camera B is active, and the connection between the monitor B and the camera E is active. On the monitor selection image shown in FIG. 8, therefore, a combination of the monitor A and the camera B and a combination of the monitor B and the camera E are shown respectively as selection items.

Note that a dash shown in the "connected apparatus name" section of the monitor selection image (FIG. 8) indicates that no camera 300 has an active connection to the monitor 200. In the example of FIG. 6, no camera 300 has an active connection to the monitor C, and therefore a dash is described as the apparatus name of the connected apparatus corresponding to the monitor C on the monitor selection image shown in FIG. 8.

Next, the control unit 102 receives an operation performed by the user to select the control target monitor using the monitor selection image displayed in S23 (S24). For example, the user can select one of the monitors A to C using the monitor selection image shown in FIG. 8.

The control unit 102 then establishes communication between the controller 100 and the monitor 200 selected by the user in S24 (S25). Processing for establishing communication between the controller 100 and the monitor 200 involves specifying the IP address of the monitor 200 and forming a TCP connection between the controller 100 and the monitor 200. The IP address of the monitor 200 is obtained from the apparatus management information (FIG. 6) managed by the apparatus management unit 105. When the monitor A is selected using the monitor selection image (FIG. 8), the control unit 102 obtains the IP address "192.168.0.101" of the monitor A from the apparatus management information (FIG. 6). The control unit 102 then specifies the IP address "192.168.0.101", and forms a TCP connection between the controller A and the monitor A.

Next, the control unit 102 determines whether or not any of the cameras 300 has an active connection to the monitor 200 (the selected monitor) selected by the user in S24 on the basis of the apparatus management information (FIG. 6) managed by the apparatus management unit 105 (S26).

When no apparatus information of any camera 300 is associated with the apparatus information of the selected monitor in the apparatus management information (FIG. 6), the control unit 102 determines that no camera 300 has an active connection to the selected monitor. The flow is then terminated.

When the apparatus information of a camera 300 is associated with the apparatus information of the selected monitor in the apparatus management information (FIG. 6), the control unit 102 determines that a camera 300 having an active connection to the selected monitor exists. More specifically, the camera 300 having the apparatus information that is associated with the apparatus information of the selected monitor in the apparatus management information (FIG. 6) is specified as the camera 300 having an active connection to the selected monitor. In other words, the camera 300 identified by the pair information of the selected monitor is specified as the camera 300 having an active connection to the selected monitor. The processing then advances to S27.

In S27, the control unit 102 establishes communication between the controller 100 and the camera 300 specified in S26 (the camera 300 having an active connection to the monitor 200 selected by the user in S24). Processing for establishing communication between the controller 100 and the camera 300 involves specifying the IP address of the camera 300 and forming a TCP connection between the controller 100 and the camera 300. The IP address of the camera 300 is obtained from the apparatus management information (FIG. 6) managed by the apparatus management unit 105. Referring to the apparatus management information shown in FIG. 6, the camera 300 that has an active connection to the monitor A is the camera B. Therefore, when the monitor A is selected using the monitor selection image (FIG. 8), the control unit 102 obtains the IP address "192.168.0.202" of the camera B from the apparatus management information (FIG. 6). The control unit 102 then specifies the IP address "192.168.0.202", and forms a TCP connection between the controller A and the camera B.

Hence, communication can be established between the controller 100 and the appropriate monitor 200 and camera 300 which are interlock control simply by having the user perform an operation to select the monitor 200 on the controller 100. When communication is established, the controller 100 can perform interlock control of the appropriate monitor 200 and camera 300.

(Operation 3 of Controller)

In this embodiment, when interlock control of the monitor 200 and the camera 300 is performed, the control unit 102 obtains first attribute information from the monitor 200 and second attribute information from the camera 300 (second acquisition processing). The first attribute information is information identifying formats in which the image data can be input into the monitor 200, and the second attribute information is information identifying formats in which the image data can be output by the camera 300. The plurality of formats identified by the first attribute information correspond to the plurality of input modes that can be set by the monitor 200, and the plurality of formats identified by the second attribute information correspond to the plurality of output modes that can be set by the camera 300.

The control unit 102 switches the input mode set in the monitor 200 to an input mode that is suitable for inputting image data in a shared format, which is a format shared by the first attribute information and the second attribute information. Further, the control unit 102 switches the output mode set in the camera 300 to an output mode for outputting image data in the shared format.

Furthermore, when a plurality of shared formats exist, the control unit 102 selects one of the plurality of shared formats and switches the input mode set in the monitor 200 to an input mode that is suitable for inputting image data in the selected shared format. The control unit 102 then switches the output mode set in the camera 300 to an operating mode for outputting image data in the selected shared format.

Figure 11:
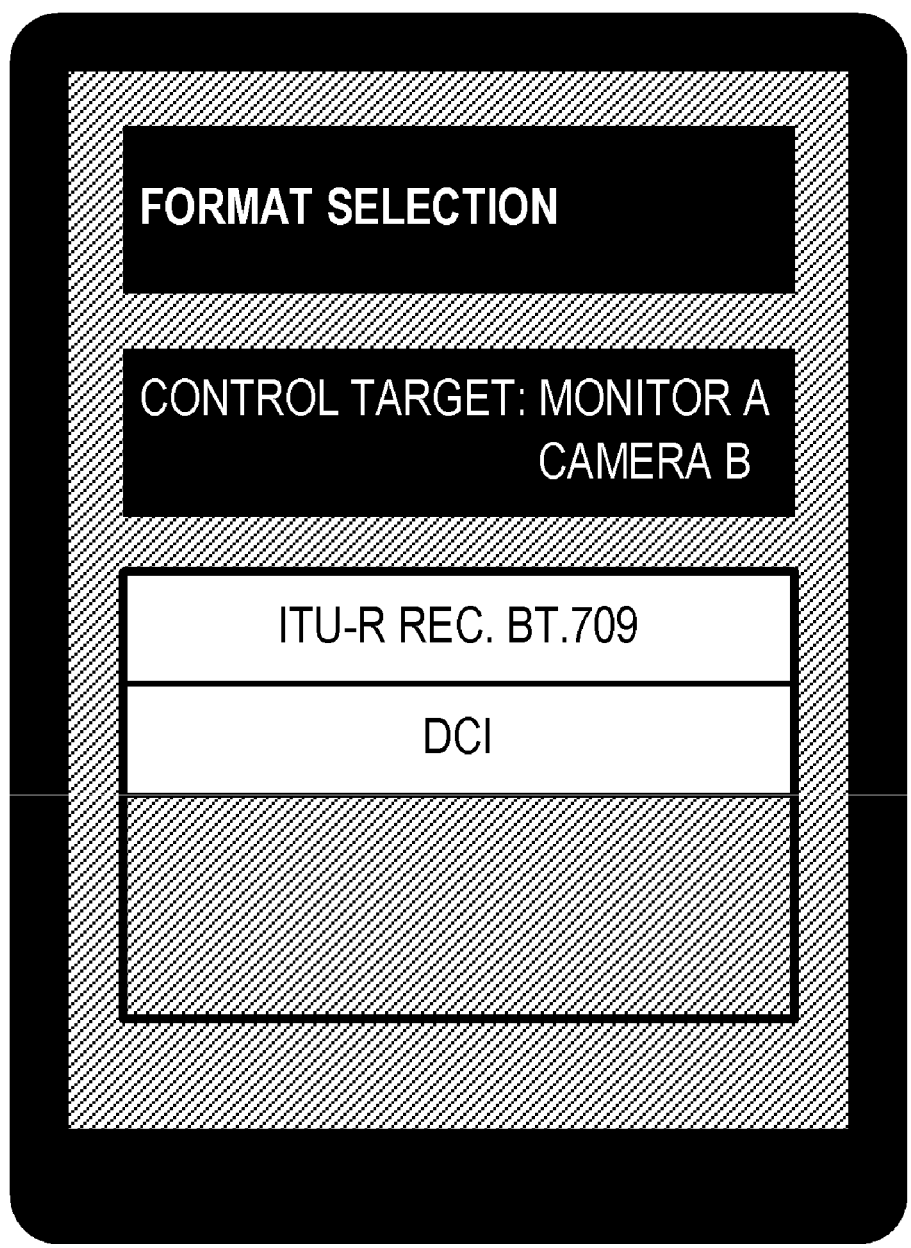
FIG. 11 is a view showing an example of a format selection image according to the first embodiment.

In the configuration shown in FIG. 1, when communication is established between the controller A and the monitor A and camera B, the controller A obtains the first attribute information from the monitor A and the second attribute information from the camera B. As a result, the controller A can display a format selection image shown in FIG. 11 on the screen of the controller A. The format selection image is an image used by the user to select a post-interlock control operating mode (more specifically, a format corresponding to the post-interlock control (post-switch) operating mode). In the example of FIG. 11, the format selection image includes a list of formats (shared formats) shared by the first attribute information and the second attribute information. By limiting the formats shown on the format selection image to the shared formats, selection of a format other than a shared format can be suppressed. In the example of FIG. 11, two formats, namely ITU-R Rec. BT. 709 and DCI, are shown as the shared formats. When the user uses the format selection image to select DCI, the controller A switches the operating modes of both the monitor A and the camera B to operating modes that are compatible with DCI.

Note that when only one shared format exists, display of the format selection image may be omitted, and the operating modes of the monitor A and the camera B may be controlled in accordance with the shared format.

An example of an operation of the controller 100 (an operation to select a format and perform interlock control of the monitor 200 and the camera 300) will be described below using a flowchart shown in FIG. 10.

Note that in this embodiment, an example in which interlock control of the input mode of the monitor 200 and the output mode of the camera 300 is performed will be described, but the interlock control is not limited thereto. For example, interlock control of a photography condition of the camera 300 and a display mode of the monitor 200 may be performed. Photography conditions include shutter speed, aperture value, ISO sensitivity, and so on, for example. Display modes include an energy saving mode in which power consumption is reduced by reducing a display brightness (a brightness on the screen), a dynamic mode in which images are displayed vividly, and so on, for example.

Further, in this embodiment, an example in which the interlock control is started in response to a user operation (a user operation to select a format using the format selection image) will be described, but the present invention is not limited thereto. For example, when a combination of a monitor and a camera of which interlock control can be performed is detected, interlock control of the detected monitor and camera may be performed automatically.

First, the control unit 102 receives a format selection image display request from the UI unit 101 (S31). The UI unit 101 outputs the display request to the control unit 102 in response to a user operation (a user operation performed on the controller 100) for displaying the format selection image, for example.

Figure 7:
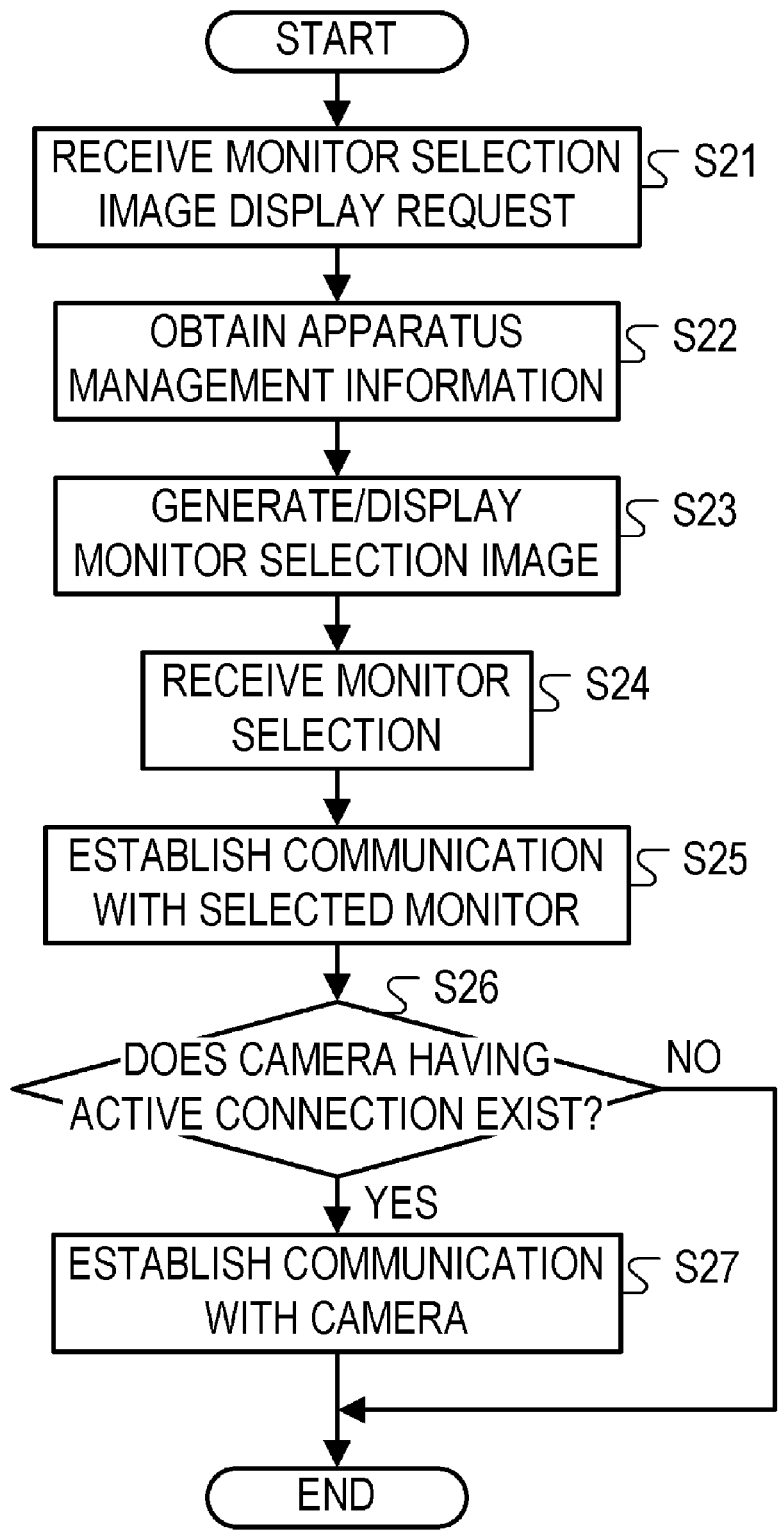
FIG. 7 is a flowchart showing an example of an operation of the controller according to the first embodiment.

Next, the control unit 102 obtains the first attribute information from the monitor 200 with which communication was established in S25 of FIG. 7 (S32). More specifically, the control unit 102 transmits a first attribute information acquisition request to the monitor 200 with which communication was established in S25 of FIG. 7. The first attribute information acquisition request is transmitted to the monitor 200 via the communication unit 103. The control unit 203 of the monitor 200, after receiving the acquisition request via the communication unit 201, obtains the first attribute information of the monitor 200 from the data management unit 204. The control unit 203 of the monitor 200 then transmits the obtained first attribute information to the controller 100 via the communication unit 201. The control unit 102 of the controller 100 receives the first attribute information transmitted by the monitor 200 via the communication unit 103.

Note that the first attribute information of the monitor 200 may be obtained immediately after communication is established with the monitor 200 in S25 of FIG. 7.

The control unit 102 then determines whether or not a camera 300 having an active connection to the monitor 200 (an acquisition target monitor) from which the first attribute information is obtained in S32 exists (S33). In other words, the control unit 102 determines whether or not a camera 300 having an active connection to the monitor 200 with which communication was established in S25 of FIG. 7 exists.

When the processing of S27 in FIG. 7 was not performed, the control unit 102 determines that a camera 300 having an active connection to the acquisition target monitor does not exist. The processing then advances to S36.

When communication with the camera 300 was established in S27 of FIG. 7, the control unit 102 determines that a camera 300 having an active connection to the acquisition target monitor exists. More specifically, the camera 300 with which communication was established in S27 is specified as the camera 300 having an active connection to the acquisition target monitor. The processing then advances to S34.

Note that the determination result obtained in S26 of FIG. 7 may be used in S33. Furthermore, the determination of S33 as to whether or not a camera 300 having an active connection to the acquisition target monitor exists may be made on the basis of the apparatus management information (FIG. 6), similarly to S26 in FIG. 7.

In S34, the control unit 102 obtains the second attribute information from the camera 300 with which communication was established in S27 of FIG. 7. More specifically, the control unit 102 transmits a second attribute information acquisition request to the camera 300 with which communication was established in S27 of FIG. 7. The second attribute information acquisition request is transmitted to the camera 300 via the communication unit 103. The control unit 303 of the camera 300, after receiving the acquisition request via the communication unit 301, obtains the second attribute information of the camera 300 from the data management unit 304. The control unit 303 of the camera 300 then transmits the obtained second attribute information to the controller 100 via the communication unit 301. The control unit 102 of the controller 100 receives the second attribute information transmitted by the camera 300 via the communication unit 103.

Note that the second attribute information of the camera 300 may be obtained immediately after communication is established with the camera 300 in S27 of FIG. 7.

Next, the control unit 102 extracts a format (a shared format) that is shared by the first attribute information obtained in S32 and the second attribute information obtained in S34 from the first attribute information and the second attribute information (S35). FIG. 9 shows examples of formats identified by the first attribute information of the monitor A in FIG. 1, formats identified by the second attribute information of the camera B in FIG. 1, and shared formats. In the example of FIG. 9, the first attribute information of the monitor A identifies three formats, namely ITU-R Rec. BT. 709, DCI, and ITU-R Rec. BT. 2020. The second attribute information of the camera B identifies two formats, namely ITU-R Rec. BT. 709 and DCI. In this case, as shown in FIG. 9, two formats, namely ITU-R Rec. BT. 709 and DCI, are extracted as the formats shared by the first attribute information of the monitor A and the second attribute information of the camera B.

The processing then advances to S36.

When the output mode of the camera 300 is an output mode corresponding to ITU-R Rec. BT. 709, image data in the color gamut prescribed by ITU-R Rec. BT. 709 are output from the camera 300. When the input mode of the monitor 200 is an input mode corresponding to ITU-R Rec. BT. 709, image display is performed on the assumption that image data in the color gamut prescribed by ITU-R Rec. BT. 709 are input. For example, the image data for display are generated by applying image processing to the image data on the assumption that image data in the color gamut prescribed by ITU-R Rec. BT. 709 are input.

When the output mode of the camera 300 is an output mode corresponding to DCI, image data in a color gamut prescribed by DCI are output from the camera 300. When the input mode of the monitor 200 is an input mode corresponding to DCI, image display is performed on the assumption that image data in the color gamut prescribed by DCI are input.

When the output mode of the camera 300 is an output mode corresponding to ITU-R Rec. BT. 2020, image data in a color gamut prescribed by ITU-R Rec. BT. 2020 are output from the camera 300. When the input mode of the monitor 200 is an input mode corresponding to ITU-R Rec. BT. 2020, image display is performed on the assumption that image data in the color gamut prescribed by ITU-R Rec. BT. 2020 are input.

In S36, the control unit 102 generates the format selection image and displays the generated format selection image on the screen (the screen of the controller 100). When a camera 300 having an active connection to the acquisition target monitor exists, a format selection image including a list of the shared formats extracted in S35 is generated. When a camera 300 having an active connection to the acquisition target monitor does not exist, a format selection image including a list of the formats identified by the first attribute information obtained in S32 is generated. When the monitor A of FIG. 1 is selected using the monitor selection image (FIG. 8), the format selection image shown in FIG. 11 is generated and displayed.

Next, the control unit 102 receives a user operation performed to select a format (a format corresponding to the operating modes of the monitor 200 and the camera 300 following the interlock control) using the format selection image displayed in S36 (S37). For example, the user can select either ITU-R Rec. BT. 709 or DCI using the format selection image shown in FIG. 11. The control unit 102 selects a single shared format in response to the user operation (the selection operation).

The control unit 102 then issues a request to the monitor 200 with which communication was established in S25 of FIG. 7 to switch to the input mode corresponding to the shared format selected in S37 (S38). The input mode switch request is transmitted to the monitor 200 via the communication unit 103. The control unit 203 of the monitor 200, after receiving the input mode switch request from the controller 100 via the communication unit 201, switches the set input mode to the input mode corresponding to the shared format selected in S37. The control unit 203 then notifies the image processing unit 206 of the switched input mode. When DCI is selected in S37, the input mode corresponding to DCI is set by the monitor 200.

Next, the control unit 102 determines whether or not a camera 300 having an active connection to the monitor 200 (a request receiving monitor) to which the input mode switch request was issued in S38 exists (S39).

When the processing of S27 in FIG. 7 was not performed, the control unit 102 determines that a camera 300 having an active connection to the request receiving monitor does not exist. The flow is then terminated.

When communication with the camera 300 was established in S27 of FIG. 7, the control unit 102 determines that a camera 300 having an active connection to the request receiving monitor exists. More specifically, the camera 300 with which communication was established in S27 is specified as the camera 300 having an active connection to the request receiving monitor. The processing then advances to S40.

Figure 10:
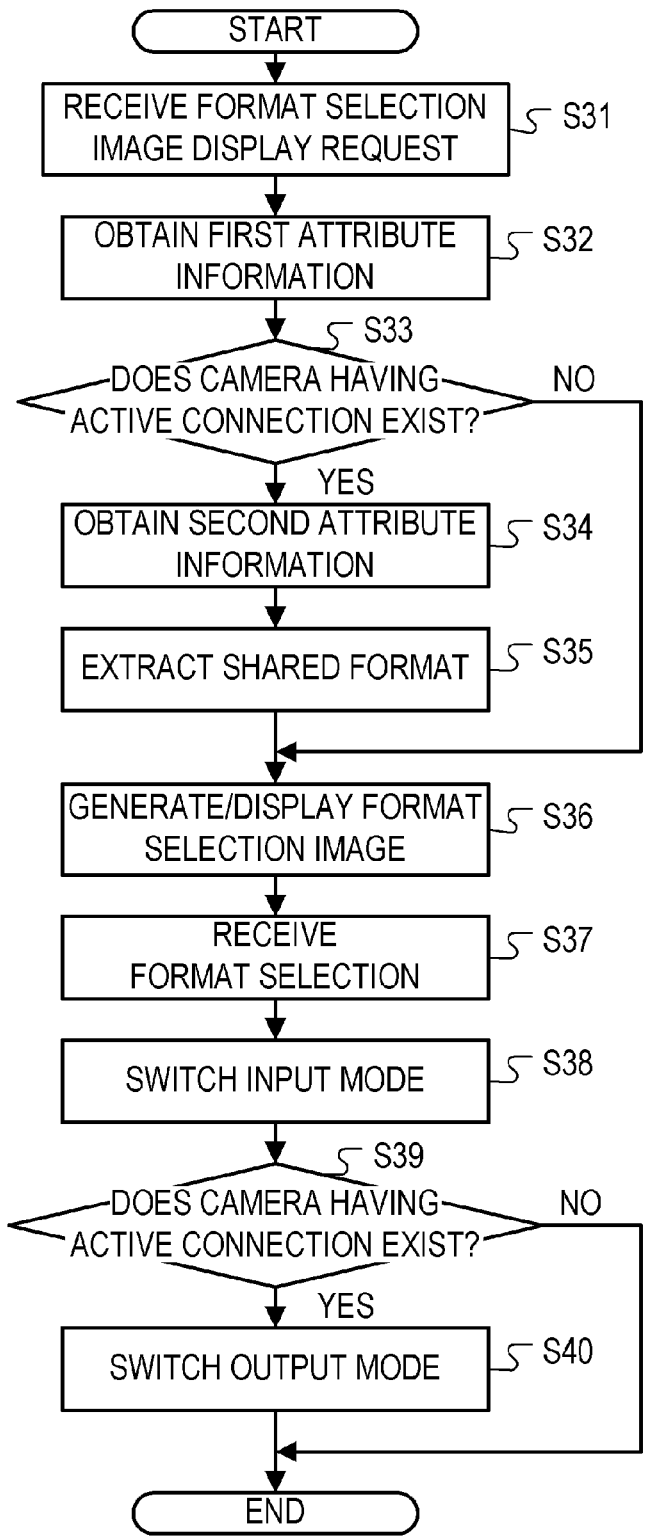
FIG. 10 is a flowchart showing an example of an operation of the controller according to the first embodiment.

Note that the determination result obtained in S26 of FIG. 7 or the determination result obtained in S33 of FIG. 10 may be used in S39. Furthermore, the determination of S39 as to whether or not a camera 300 having an active connection to the request receiving monitor exists may be made on the basis of the apparatus management information (FIG. 6), similarly to S26 in FIG. 7.

In S40, the control unit 102 issues a request to the camera 300 specified in S39 to switch to the output mode corresponding to the shared format selected in S37. The output mode switch request is transmitted to the camera 300 via the communication unit 103. The control unit 303 of the camera 300, after receiving the output mode switch request from the controller 100 via the communication unit 301, switches the set output mode to the output mode corresponding to the shared format selected in S37. The control unit 303 then notifies the signal processing unit 306 of the switched output mode. When DCI is selected in S37, the output mode corresponding to DCI is set by the camera 300.

Hence, when a camera 300 having an active connection to the monitor 200 exists, the formats (shared formats) that are shared by the monitor 200 and the camera 300 are presented to the user. The user selects one of the one or more presented shared formats, and as a result, operating modes corresponding to the selected shared format are set in both the monitor 200 and the camera 300.

According to this embodiment, as described above, pair information identifying a monitor (an image input apparatus) and a camera (an image output apparatus) having an active connection to the monitor is generated in the monitor. The controller (the control apparatus) obtains the pair information from the monitor, and performs interlock control of the monitor and the camera on the basis of the pair information. Hence, interlock control of a plurality of apparatuses can be performed easily and accurately, enabling a great improvement in operating efficiency.

More specifically, the pair information is information identifying a monitor and the camera that has an active connection to the monitor. Therefore, the pair information can be used to specify with a high degree of precision an appropriate combination of a monitor and a camera which are targets of interlock control. An appropriate combination of a monitor and a camera which are targets of interlock control can be specified even when a plurality of monitors and a plurality of cameras exist on the same network as the controller, for example. Moreover, an appropriate combination of a monitor and a camera which are targets of interlock control can be specified when a plurality of cameras are connected to the monitor.

By using the pair information, the user no longer needs to select a combination of apparatuses which are targets of interlock control, and therefore a load placed on the user can be lightened. Furthermore, operational errors such as erroneous selection of a combination of apparatuses by the user can be suppressed.

(Second Embodiment)

A system according to a second embodiment of the present invention will now be described with reference to the drawings.

In this embodiment, a case in which operating modes suitable for inputting and outputting RAW data (image data in a RAW format) are set when interlock control of the camera and the monitor is performed will be described.

The system according to this embodiment is configured largely identically to that of FIG. 1 illustrating the first embodiment.

In FIG. 1, the output mode for outputting image data in the color gamut prescribed by ITU-R Rec. BT. 709 is set in the camera B. Further, the input mode that is suitable for inputting image data in the color gamut prescribed by ITU-R Rec. BT. 709 is set in the monitor A.

In FIG. 1, when the output mode of the camera B is switched to an output mode for outputting RAW data, RAW data are output from the camera B. In other words, the camera B can output image data without a reduction in the dynamic range. Accordingly, image data having an extremely wide dynamic range can be displayed by the monitor A as a result of photography performed by the camera B. In this case, however, the input mode of the monitor A that displays the image data output from the camera B must be switched to an input mode that is suitable for inputting RAW data.

In the input mode that is suitable for inputting RAW data, image processing is applied to the image data (the RAW data).

For example, input device transform (IDT) processing, reference rendering transform (RRT) processing, and output device transform (ODT) processing, which are defined by Academy Color Encoding System standards (ACES standards), are applied to the RAW data.

More specifically, debayering processing is applied to the RAW data, whereupon IDT processing is applied to the debayered image data. RRT processing and ODT processing are then applied in that order to the IDT-processed image data.

The IDT processing is processing for converting image data in a camera-specific color space into image data in an ACES color space (ACES data). The ACES color space is a color space that is defined by a color management standard advocated by Academy of Motion Picture Arts and Sciences (AMPAS), and that is common to input and output devices. ACES data are 16 bit-encoded data, and therefore data having an extremely wide dynamic range can be handled as the ACES data.

Note that during the IDT processing, a camera-specific parameter must be used. In other words, the parameter used during the IDT processing is dependent on the camera. In FIG. 1, when RAW data output from the camera B are to be displayed by the monitor A, IDT processing using a parameter corresponding to the camera B must be executed. In other words, a parameter corresponding to the camera B must be applied as the parameter used during the IDT processing that is applied to the image data corresponding to the camera B (the image data obtained by applying debayering processing to the RAW data output from the camera B).

The RRT processing is reference rendering transform processing for converting the ACES data into output color encoding specification (OCES) data that are compatible with a certain idealized display device. For example, the RRT processing includes gradation conversion processing, color correction processing, and so on using a 1D-LUT and a 3D-LUT.

The ODT processing is output device transform processing for converting the RRT-processed OCES data in accordance with the output device. For example, the ODT processing includes gradation conversion processing, color space conversion processing, and so on using a 1D-LUT.

By performing the RRT processing and the ODT processing, the ACES data are converted into image data in a monitor-specific color space.

Figure 12:
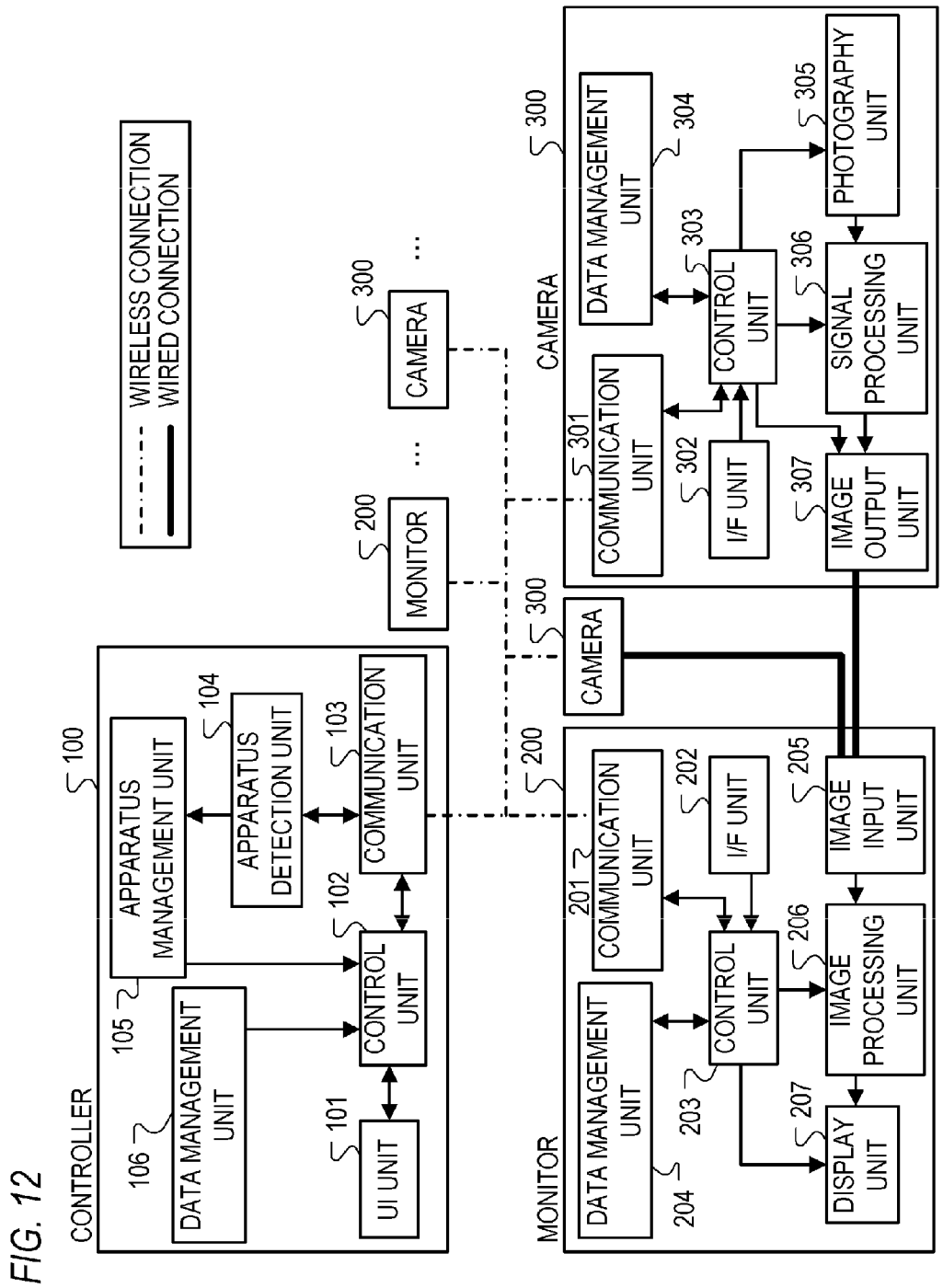
FIG. 12 is a block diagram showing an example of a configuration of a system according to a second embodiment.

FIG. 12 is a block diagram showing an example of a configuration of the system according to this embodiment. With the configuration shown in FIG. 12, the controller A can set operation signal modes corresponding to the RAW format in both the monitor A and the camera B. Further, the controller A can set a parameter corresponding to the camera B in the monitor A as the parameter used during the IDT processing that is applied to the image data corresponding to the camera B.

Note that in FIG. 12, identical function units to the function units of the first embodiment, shown in FIG. 2, have been allocated identical reference numerals to FIG. 2, and description thereof has been omitted.

As shown in FIG. 12, the controller 100 further includes a data management unit 106.

The data management unit 106 manages (stores) the parameter used during the IDT processing for each camera (each image output apparatus). For example, the data management unit 106 manages the parameters used during the IDT processing in association with model names of the cameras 300. The parameters managed by the data management unit 106 may be obtained from the monitor 200 via the communication unit 103, or may be downloaded in advance from a website. Any method may be used to obtain the parameters managed by the data management unit 106.

(System Operation)

An operation of the system according to this embodiment will now be described.

First, in the configuration shown in FIG. 1, the monitor A generates and updates the pair information to enable the controller A to perform interlock control of the monitor A and the camera B. The monitor 200 shown in FIG. 12 generates and updates the pair information by executing identical processing to that of the flowchart shown in FIG. 3. Note, however, that in S14, the control unit 203 of the monitor 200 obtains the model name of the camera 300 in addition to the apparatus name, IP address, and UUID of the camera 300.

Next, in the configuration shown in FIG. 1, the controller A obtains the pair information from the monitor A in order to obtain the IP addresses of the monitor A and the camera B which are targets of interlock control. The controller 100 shown in FIG. 12 executes identical processing to that of the sequence diagram shown in FIG. 5. As a result, the monitor 200 is detected, and the pair information or the apparatus information is obtained from the monitor 200. Note, however, that in this embodiment, as shown in FIG. 13, the model name of the camera 300 having an active connection to the monitor 200 is included in the pair information. FIG. 13 is a view showing an example of apparatus management information (information identifying the pair information or the apparatus information for each monitor) according to this embodiment.

In the configuration shown in FIG. 1, the controller A then selects the monitor A and the camera B which are targets of interlock control, and establishes communication with the selected monitor A and camera B. The controller 100 shown in FIG. 12 executes identical processing to that of the flowchart shown in FIG. 7. As a result, the monitor 200 and the camera 300 which are targets of interlock control are selected, and communication is established between the controller 100 and the selected monitor 200 and camera 300.

Next, in the configuration shown in FIG. 1, the controller A selects a format, and sets operating modes corresponding to the selected format in the monitor A and the camera B. The controller 100 shown in FIG. 12 executes processing shown on a flowchart in FIG. 14 instead of the processing of the flowchart shown in FIG. 10. As a result, a format is selected and operating modes corresponding to the selected format are set in the monitor 200 and the camera 300.

Figure 14:
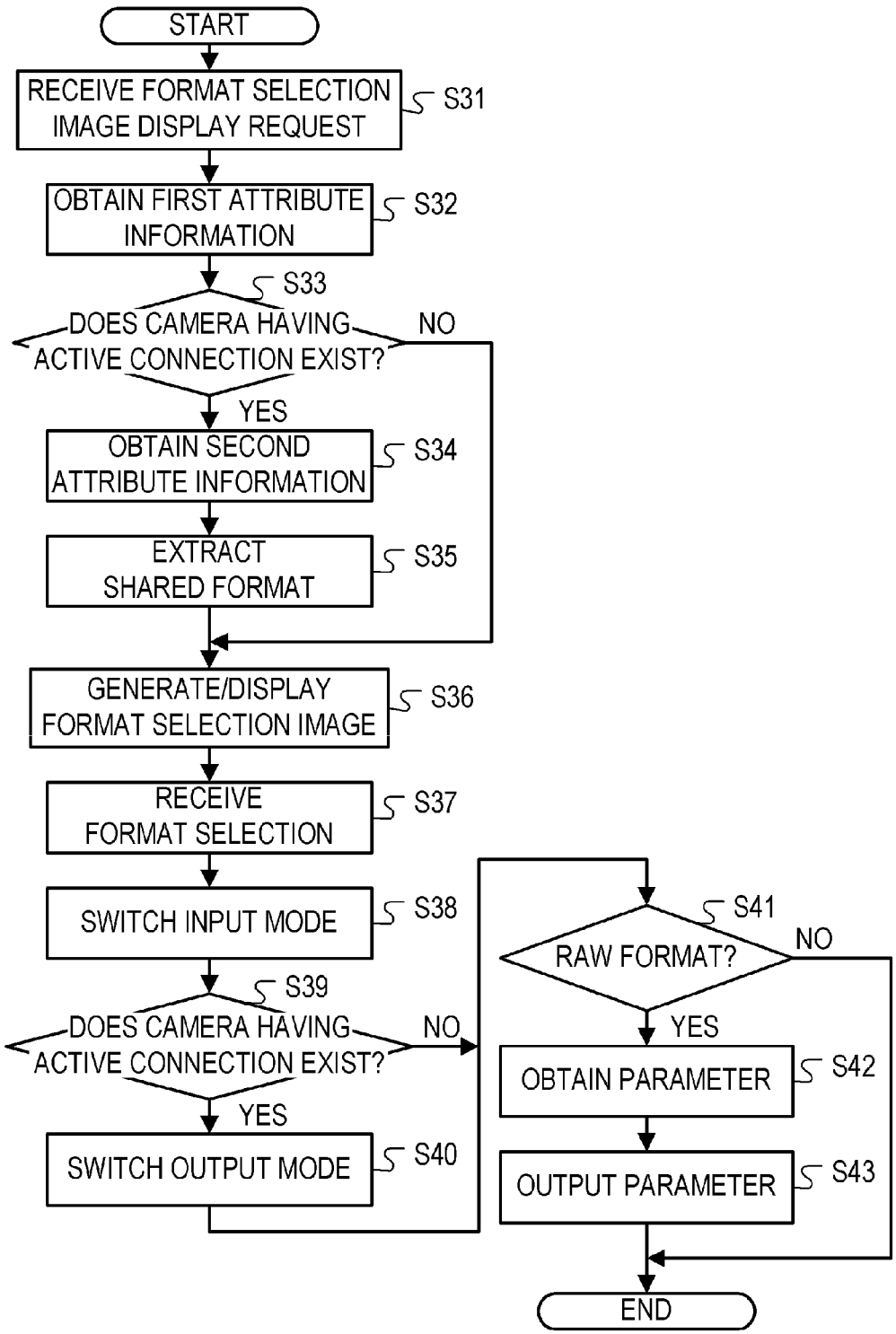
FIG. 14 is a flowchart showing an example of an operation of a controller according to the second embodiment.

Processing of S31 to S40 in FIG. 14 is identical to the processing of S31 to S40 in FIG. 10. In other words, in this embodiment, a format is selected and operating modes corresponding to the selected format are set in the monitor 200 and the camera 300 by performing similar processing to the first embodiment. In this embodiment, however, processing of S41 is performed after the processing of S40.

In S41, the control unit 102 determines whether or not the shared format selected in S37 is the RAW format. When the shared format selected in S37 is the RAW format, the processing advances to S42, and when the shared format selected in S37 is not the RAW format, the flow is terminated.

In S42, the control unit 102 obtains the model name of the camera 300 (a request receiving camera) to which the output mode switch request was issued in S40 from the apparatus management information (FIG. 14) managed by the apparatus management unit 105. The control unit 102 then obtains a parameter corresponding to the obtained model name from the data management unit 106. The processing then advances to S43.

In S43, the control unit 102 outputs the parameter obtained in S42 to the request receiving monitor of S38 as the parameter to be used during the image processing applied to the image data output from the request receiving camera (first output processing). More specifically, the parameter is output to the request receiving monitor as the parameter to be used during the IDT processing that is applied to the image data corresponding to the request receiving camera (i.e. the image data obtained by applying debayering processing to the RAW data output from the request receiving camera). The parameter is transmitted to the monitor 200 via the communication unit 103.

The control unit 203 of the monitor 200 receives (obtains) the parameter to be used during the IDT processing from the controller 100 via the communication unit 201 (fourth acquisition processing). The control unit 203 then sets the obtained parameter in the image processing unit 206. The image processing unit 206 applies image processing using the parameter obtained from the controller 100 to the image data input from the camera 300. More specifically, the image processing unit 206 applies debayering processing to the RAW data input from the camera 300. The image processing unit 206 then generates ACES data by applying IDT processing using the parameter obtained from the controller 100 to the debayered image data. The image processing unit 206 then generates the image data for display by applying RRT processing and ODT processing to the generated ACES data.

Note that when only one camera 300 has an active connection to the monitor 200, the parameter may simply be transmitted from the controller 100 to the monitor 200. However, a plurality of cameras 300 may have an active connection to the monitor 200. In this case, the parameter used during the IDT processing must be switched for each camera 300 having an active connection. It is therefore preferable to transmit the parameter from the controller 100 to the monitor 200 in association with information identifying the camera 300 (the model name or the like). In so doing, the IDT processing can be executed by the monitor 200 while switching the used parameter for each camera 300.

According to this embodiment, as described above, when interlock control is performed to set operating modes corresponding to a specific format, the controller notifies the monitor which is the target of interlock control of the parameter that corresponds to the camera which is the target of interlock control. Image processing is then performed by the monitor using the notified parameter from the controller. Image data in the specific format are image data that require image processing using a camera-dependent parameter, for example RAW data.

Therefore, when interlock control is performed to set operating modes corresponding to a specific format, the monitor can be caused to execute appropriate image processing as camera-dependent image processing. As a result, appropriate images can be displayed by the monitor not only when an operating mode corresponding to a standard format is set, but also when an operating mode corresponding to a nonstandard format is set. Image data in a standard format are image data that do not require image processing using a camera-dependent parameter, for example image data in a format such as ITU-R Rec. BT. 709, DCI, or the like. Image data in a nonstandard format are image data that require image processing using a camera-dependent parameter. In other words, the nonstandard format corresponds to the specific format.

Note that in this embodiment, an example of a case in which the specific format is the RAW format was described, but the present invention is not limited thereto, and the specific format may be any image data format that requires image processing using a camera-dependent parameter.

(Third Embodiment)

A system according to a third embodiment of the present invention will now be described with reference to the drawings.

In this embodiment, an example of a case in which a plurality of cameras have active connections to a monitor, such as a case in which multi-screen display is performed on the monitor, will be described.

Figure 15:
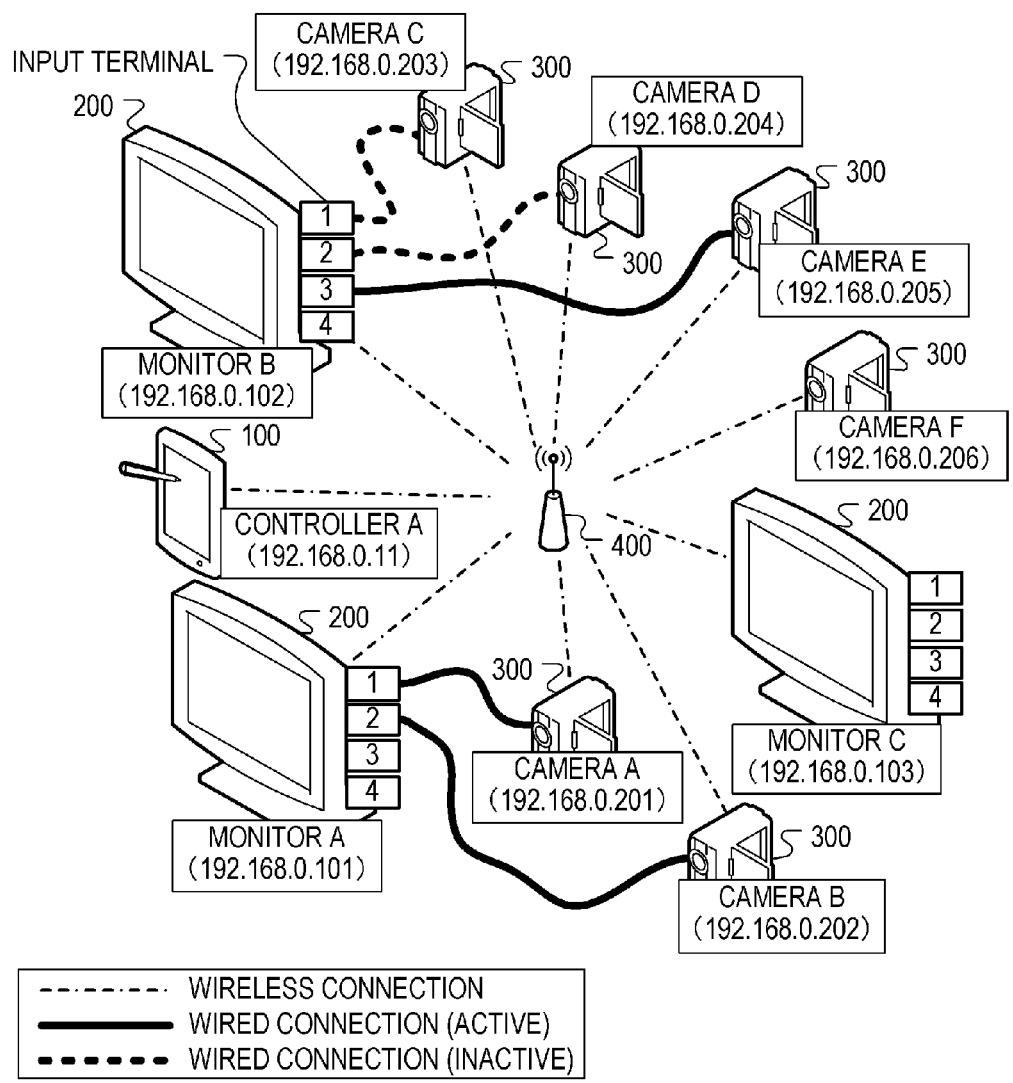
FIG. 15 is a view showing an example of a connection configuration of a system according to a third embodiment.

FIG. 15 is a view showing an example of a connection configuration of the system according to this embodiment.

In FIG. 1 illustrating the first embodiment, the input terminal 2 is the only active input terminal of the monitor A, but in FIG. 15, both the input terminal 1 and the input terminal 2 of the monitor A are active. FIG. 15 is otherwise identical to FIG. 1.

In FIG. 15, the camera A is connected to the input terminal 1 of the monitor A and the camera B is connected to the input terminal 2 of the monitor A. The monitor A displays the image data output from the camera A and the image data output from the camera B on two screens. Further, operating modes corresponding to ITU-R Rec. BT. 709 are set respectively in the monitor A, the camera A, and the camera B.

Here, when the input mode of the monitor A is switched to the input mode corresponding to DCI, the respective output modes of the camera A and the camera B must also be switched to the output modes corresponding to DCI. The operating modes can be switched using similar configurations to the configurations shown in FIG. 2, illustrating the first embodiment.

(System Operations)

Operations of the system according to this embodiment will now be described using FIGS. 2 and 15.

First, in the configuration shown in FIG. 15, the monitor A generates and updates the pair information to enable the controller A to perform interlock control of the monitor A, the camera A, and the camera B. The monitor 200 shown in FIG. 2 generates and updates the pair information by executing identical processing to that of the flowchart shown in FIG. 3.

Figure 3:
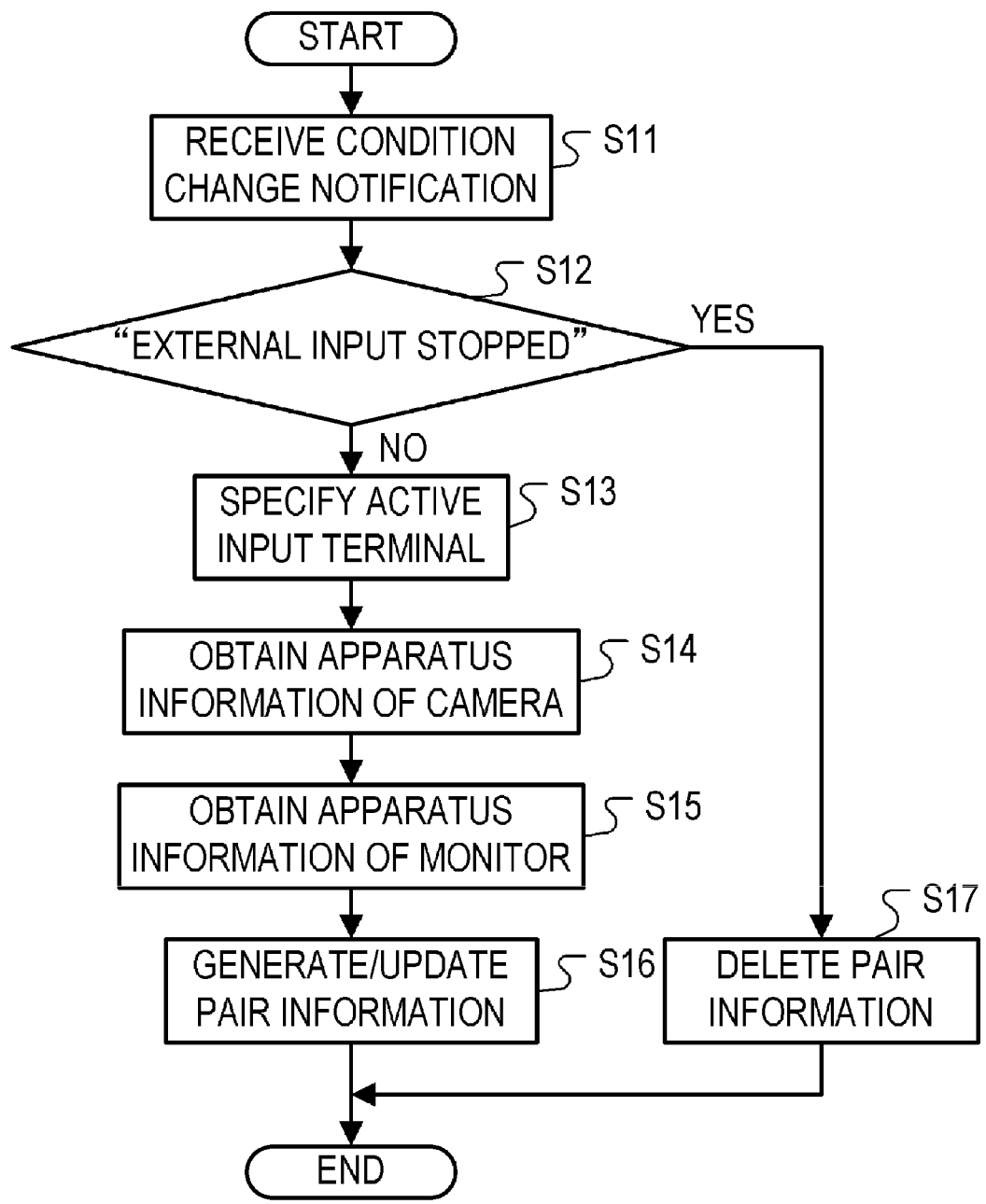
FIG. 3 is a flowchart showing an example of an operation of a monitor according to the first embodiment.

Note, however, that when the monitor 200 includes a plurality of input terminals in the "active" connection condition, the processing shown in FIG. 3 is performed on all of the input terminals in the "active" connection condition. Accordingly, when a plurality of cameras 300 have an active connection to the monitor 200, the apparatus information (the identification information) is obtained from each of the plurality of cameras 300 having an active connection. Further, a plurality of sets of pair information corresponding to the plurality of cameras 300 having an active connection is generated. The generated plurality of sets of pair information may be considered as a single set of pair information identifying the monitor 200 and the plurality of cameras 300 having an active connection to the monitor 200. In FIG. 15, the camera A and the camera B are actively connected to the monitor A. As shown in FIG. 16, therefore, the monitor A generates two sets of pair information, namely pair information identifying the monitor A and the camera A and pair information identifying the monitor A and the camera B.

Next, in the configuration shown in FIG. 15, the controller A obtains the pair information from the monitor A in order to obtain the IP addresses of the monitor A, the camera A, and the camera B which are targets of interlock control. The controller 100 executes identical processing to that of the sequence diagram shown in FIG. 5. As a result, the monitor 200 is detected, and the pair information or the apparatus information is obtained from the monitor 200.

Note, however, that when a plurality of cameras 300 have an active connection to the monitor 200, a plurality of sets of pair information (a single set of pair information identifying the monitor 200 and the plurality of cameras 300 having an active connection to the monitor 200) is obtained from the monitor 200. As shown in FIG. 16, two sets of pair information, namely the pair information identifying the monitor A and the camera A and the pair information identifying the monitor A and the camera B, are obtained from the monitor A of FIG. 15.

In the configuration shown in FIG. 15, the controller A then selects the monitor A, the camera A, and the camera B which are targets of interlock control, and establishes communication with the selected monitor A, camera A, and camera B. The controller 100 of FIG. 2 executes identical processing to that of the flowchart shown in FIG. 7. As a result, the monitor 200 and the cameras 300 which are targets of interlock control are selected, and communication is established between the controller 100 and the selected monitor 200 and cameras 300.

Figure 17:
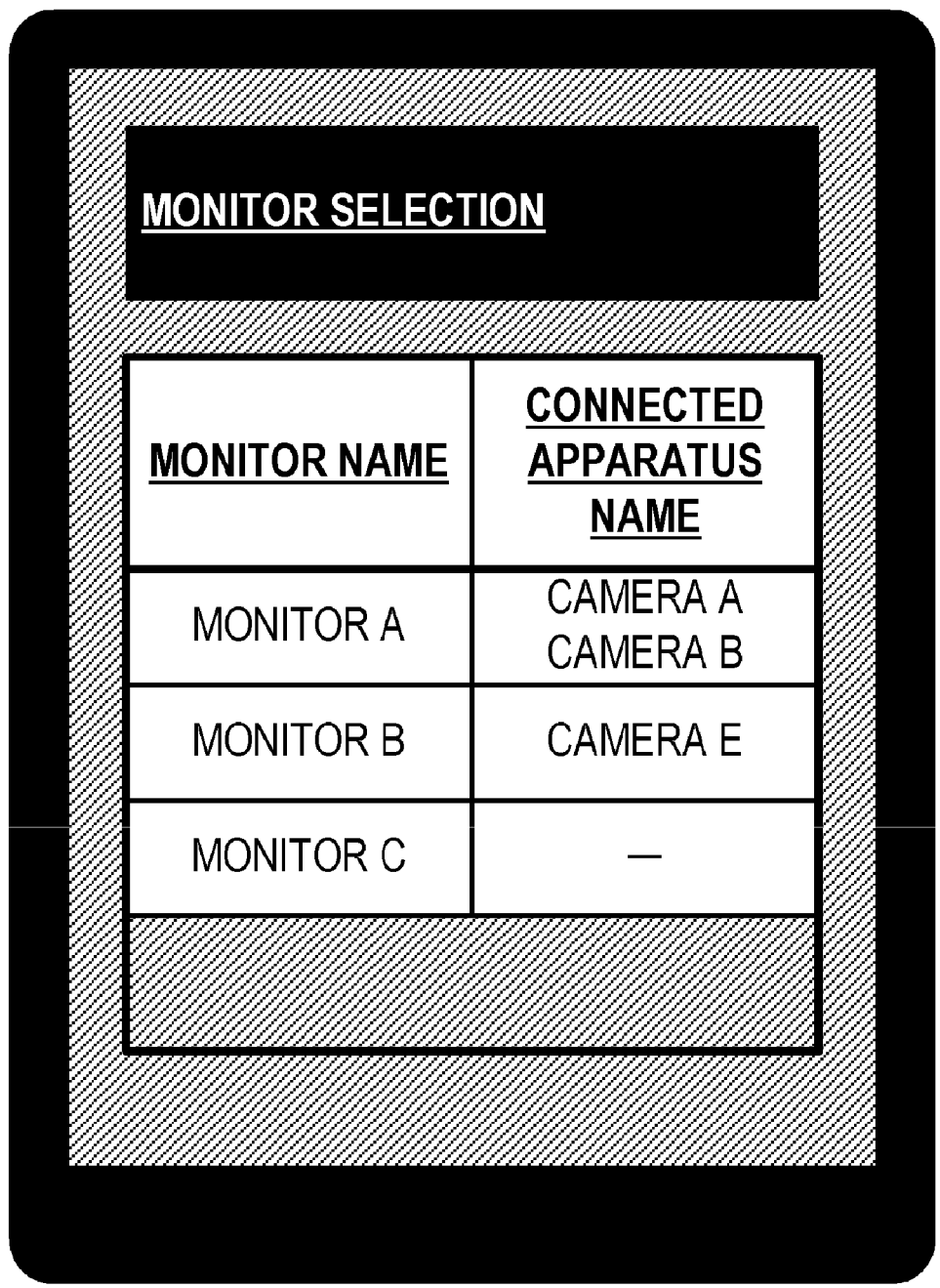
FIG. 17 is a view showing an example of a monitor selection image according to the third embodiment.

Note, however, that with regard to a monitor 200 to which a plurality of cameras 300 have an active connection, a combination of the monitor 200 and the plurality of cameras 300 having an active connection to the monitor 200 is used in S24 as a selection item on the monitor selection image. In FIG. 15, the camera A and the camera B are actively connected to the monitor A. Therefore, as shown in FIG. 17, a combination of the monitor A, the camera A, and the camera B is used as a selection item on the monitor selection image in relation to the monitor A.

Further, when a plurality of cameras 300 have an active connection to the monitor 200 selected in S24, the control unit 102 establishes communication between the controller 100, the monitor 200, and all of the cameras 300 having an active connection to the monitor 200 in S27. When the monitor A is selected in FIG. 15, communication is established between the controller A, the monitor A, the camera A, and the camera B. The IP addresses the camera A and the camera B are obtained from the apparatus management information shown in FIG. 16.

Next, in the configuration shown in FIG. 15, the controller A selects a format, and sets operating modes corresponding to the selected format in the monitor A, the camera A, and the camera B. The controller 100 shown in FIG. 2 executes identical processing to the processing of the flowchart shown in FIG. 10 or FIG. 14. As a result, a format is selected and operating modes corresponding to the selected format are set in the monitor 200 and the cameras 300.

Note, however, that when a plurality of cameras 300 have an active connection to the monitor 200, the control unit 102 obtains the second attribute information from each of the plurality of cameras 300 having an active connection in S34. In FIG. 15, the camera A and the camera B are actively connected to the monitor A. Therefore, when the monitor A is selected in S24, the controller A obtains the second attribute information from the camera A and the camera B.

Further, when a plurality of cameras 300 have an active connection to the monitor 200, the control unit 102 extracts a format shared by the first attribute information of the monitor 200 and the plurality of sets of second attribute information obtained from the plurality of cameras 300 having an active connection in S35. When the monitor A is selected in S24, a format shared by the first attribute information of the monitor A, the second attribute information of the camera A, and the second attribute information of the camera B is extracted. FIG. 18 shows examples of the first attribute information of the monitor A, the second attribute information of the camera A, the second attribute information of the camera B, and the shared formats. In the example shown in FIG. 18, the first attribute information of the monitor A identifies three formats, namely ITU-R Rec. BT. 709, DCI, and ITU-R Rec. BT. 2020. The second attribute information of the camera A identifies three formats, namely ITU-R Rec. BT. 709, DCI, and ITU-R Rec. BT. 2020. The second attribute information of the camera B identifies two formats, namely ITU-R Rec. BT. 709 and DCI. In this case, as shown in FIG. 18, two formats, namely ITU-R Rec. BT. 709 and DCI, are extracted as the format shared by the first attribute information of the monitor A, the second attribute information of the camera A, and the second attribute information of the camera B.

Furthermore, when a plurality of cameras 300 have an active connection to the monitor 200, the control unit 102 sets output modes corresponding to the format selected in S37 in all of the cameras 300 having an active connection in S40. In FIG. 15, the camera A and the camera B are actively connected to the monitor A. Therefore, when the monitor A is selected in S24, the controller A sets output modes corresponding to the format selected in S37 respectively in the camera A and the camera B.

According to this embodiment, as described above, when a plurality of cameras have an active connection to a monitor, pair information identifying the monitor and the plurality of cameras having an active connection to the monitor is generated and used. As a result, interlock control of a plurality of apparatuses can be performed easily and accurately even when a plurality of cameras have an active connection to a monitor.

Note that in this embodiment, an example in which interlock control of the monitor and all of the cameras having an active connection to the monitor is performed was described, but the present invention is not limited thereto, and instead, interlock control of the monitor and a part of the plurality of cameras having an active connection to the monitor may be performed.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-072637, filed on Mar. 31, 2014, which is here by incorporated by reference herein in its entirety.

What is claimed is:

1. A control apparatus capable of controlling a plurality of apparatuses comprising:
   a processor; and
   a memory storing a program which, when executed by the processor, causes the control apparatus to perform:
   a first obtaining process for obtaining, from one of a first apparatus into which image data is input and a second apparatus that outputs image data to be input into the first apparatus, pair information identifying the first apparatus and the second apparatus;
   a second obtaining process for obtaining first attribute information, which identifies formats in which the image data can be input into the first apparatus, from the first apparatus and second attribute information, which identifies formats in which the image data can be output by the second apparatus, from the second apparatus; and
   interlock control of the first apparatus and the second apparatus on the basis of the pair information, wherein
   in the interlock control, an operating mode in the first apparatus is set to an operating mode that is suitable for inputting image data in a shared format, which is a format shared by the first attribute information and the second attribute information, and
   in the interlock control, an operating mode in the second apparatus is set to an operating mode for outputting image data in the shared format.

2. The control apparatus according to claim 1, wherein, when a plurality of shared formats exist, in the interlock control, one of the plurality of shared formats is selected, the operating mode in the first apparatus is set to an operating mode that is suitable for inputting image data in the selected shared format, and the operating mode in the second apparatus is set to an operating mode for outputting image data in the selected shared format.

3. The control apparatus according to claim 1, wherein, when an operating mode that is suitable for inputting image data in a specific format is set in the first apparatus, the first apparatus applies image processing to the image data input therein, and
   a parameter used during the image processing is dependent on the second apparatus that outputs the image data to be input into the first apparatus in the specific format,
   the control apparatus further comprising a storage configured to store the parameter used during the image processing for each apparatus that outputs image data; and
   the program which, when executed by the processor, further causes the control apparatus to perform an outputting process for outputting the parameter that corresponds to the second apparatus to the first apparatus as the parameter to be used during the image processing applied to the image data output from the second apparatus when the shared format corresponding to the operating modes set by the interlock control is the specific format.

4. The control apparatus according to claim 3, wherein the specific format is a RAW format,
   the image processing includes IDT processing, RRT processing, and ODT processing, which are defined by ACES standards, and
   the parameter is a parameter used during the IDT processing.

5. The control apparatus according to claim 1, wherein in the first obtaining process, the pair information is obtained from the first apparatus,
   when a plurality of second apparatuses exit, in the first obtaining process, pair information identifying each of the plurality of second apparatuses is obtained, and
   the interlock control of the first apparatus and at least a part of the plurality of second apparatuses is performed.

6. The control apparatus according to claim 1, wherein the interlock control is started in response to a user operation.

7. A control method for a control apparatus that is capable of controlling a plurality of apparatuses, comprising:
   a first obtaining step of obtaining, from one of a first apparatus into which image data is input and a second apparatus that outputs image data to be input into the first apparatus, pair information identifying the first apparatus and the second apparatus;
   a second obtaining step of obtaining first attribute information, which identifies formats in which the image data can be input into the first apparatus, from the first apparatus and second attribute information, which identifies formats in which the image data can be output by the second apparatus, from the second apparatus; and
   a control step of performing interlock control of the first apparatus and the second apparatus on the basis of the pair information, wherein
   in the control step, an operating mode in the second apparatus is set to an operating mode that is suitable for inputting image data in a shared format, which is a format shared by the first attribute information and the second attribute information, and
   in the control step, an operating mode in the second apparatus is set to an operating mode for outputting image data in the shared format.

8. The control method according to claim 7, wherein, when a plurality of shared formats exist, in the control step, one of the plurality of shared formats is selected, the operating mode in the first apparatus is set to an operating mode that is suitable for inputting image data in the selected shared format, and the operating mode in the second apparatus is set to an operating mode for outputting image data in the selected shared format.

9. The control method according to claim 7, wherein, when an operating mode that is suitable for inputting image data in a specific format is set in the first apparatus, the first apparatus applies image processing to the image data input therein, and
   a parameter used during the image processing is dependent on the second apparatus that outputs the image data to be input into the first apparatus in the specific format,
   the control apparatus has a storage configured to store the parameter used during the image processing for each apparatus that outputs image data; and the control method further comprising:
an outputting step of outputting the parameter that corresponds to the second apparatus to the first apparatus as the parameter to be used during the image processing applied to the image data output from the second apparatus when the shared format corresponding to he operating modes set in the control the step is the specific format.

10. The control method according to claim 9, wherein the specific format is a RAW format,
the image processing includes IDT processing, RRT processing, and ODT processing, which are defined by ACES standards, and
the parameter is a parameter used during the IDT processing.

11. The control method according to claim 7, wherein in the first obtaining step, the pair information is obtained from the first apparatus,
when a plurality of second apparatuses exist, in the first obtaining step, pair information identifying each of the plurality of second apparatuses is obtained, and
in the control step, the interlock control of the first apparatus and at least a part of the plurality of second apparatuses is performed.

12. The control method according to claim 7, herein in the control step, the interlock control is started in response to a user operation.

13. A non-transitory computer readable medium that stores a program, wherein the program causes a computer to execute a control method for a control apparatus that is capable of controlling a plurality of apparatuses,
the control method includes:
a first obtaining step of obtaining, from one of a first apparatus into which image data is input and a second apparatus that outputs image data to be input into the first apparatus, pair information identifying the first apparatus and the second apparatus;
a second obtaining step of obtaining first attribute information, which identifies formats in which the image data can be input into the first apparatus, from the first apparatus and second attribute information, which identifies formats in which the image data can be output by the second apparatus, from the second apparatus; and
a control step of performing interlock control of the first apparatus and the second apparatus on the basis of the pair information,
in the control step, an operating mode in the first apparatus is set to an operating mode that is suitable for inputting image data in a shared format, which is a format shared by the first attribute information and the second attribute information, and
in the control step, an operating mode in the second apparatus is set to an operating mode for outputting image data in the shared format.

14. The control apparatus according to claim 1, wherein the shared format is ITU-R (International Telecommunication Union Radiocommunication sector) Rec, BT. 709 or DCI (Digital Cinema Initiatives).

15. The control apparatus according to claim 1, wherein the first apparatus is a monitor, and the second apparatus is a camera.

16. The control apparatus according to claim 1, wherein the pair information includes at least one of IP address, apparatus name, model number, and serial number, of the first apparatus, and at least one of IP address, apparatus name, model number, and serial number, of the second apparatus.

* * * * *